United States Patent
Okamoto et al.

(10) Patent No.: US 9,261,288 B2
(45) Date of Patent: Feb. 16, 2016

(54) AIR CONDITIONING SYSTEM FOR ADJUSTING TEMPERATURE AND HUMIDITY

(71) Applicant: DAIKIN INDUSTRIES, LTD., Osaka-shi, Osaka (JP)

(72) Inventors: Yasunori Okamoto, Sakai (JP); Koichi Ishida, Kusatsu (JP); Yoshihiro Nakagawa, Osaka (JP); Hideki Uchida, Osaka (JP); Tetsurou Iwata, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 14/369,170

(22) PCT Filed: Dec. 26, 2012

(86) PCT No.: PCT/JP2012/083586
§ 371 (c)(1),
(2) Date: Jun. 26, 2014

(87) PCT Pub. No.: WO2013/099913
PCT Pub. Date: Jul. 4, 2013

(65) Prior Publication Data
US 2015/0115047 A1   Apr. 30, 2015

(30) Foreign Application Priority Data

Dec. 28, 2011 (JP) ................................ 2011-290074

(51) Int. Cl.
*F25B 29/00* (2006.01)
*F24F 11/00* (2006.01)
(Continued)

(52) U.S. Cl.
CPC ............. *F24F 11/0012* (2013.01); *F24F 3/153* (2013.01); *F24F 11/008* (2013.01);
(Continued)

(58) Field of Classification Search
CPC .... F24F 3/153; F24F 11/0012; F24F 11/0079; F24F 11/008; F24F 11/0015; F24F 11/0076; F24F 2011/0047; Y02B 30/746
See application file for complete search history.

(56) References Cited

U.S. PATENT DOCUMENTS 3,444,921 A  *  5/1969  Carapico, Jr. .................. 165/229
4,942,740 A  *  7/1990  Shaw .................... F24F 3/1405
                                                                       165/297

(Continued)

FOREIGN PATENT DOCUMENTS

EP         2806223 A1  *  11/2014
JP         57-120042 A        7/1982
(Continued)

OTHER PUBLICATIONS

International Search Report of corresponding PCT Application No. PCT/JP2012/083586 dated Mar. 26, 2013.
(Continued)

*Primary Examiner* — Ljiljana Ciric
(74) *Attorney, Agent, or Firm* — Global IP Counselors

(57) ABSTRACT

An air conditioning system processes sensible heat load and latent heat load of a target space, and adjusts temperature and humidity of the target space. The air conditioning system includes a cooling heat exchanger circulating a heat exchanging medium to cool and dehumidify air blown into the target space, a heater heating the air cooled and dehumidified by the heat exchanger, a staged variable speed fan creating a flow of the air blown into the target space through the heat exchanger and the heater, and a control unit. The control unit has a cooling adjusting unit adjusting a quantity of cooling supplied from the heat exchanging medium to the air in the heat exchanger, a heating adjusting unit adjusting a quantity of heating supplied from the heater to the air, and an air flow adjusting unit adjusting an air flow volume supplied by the fan.

4 Claims, 13 Drawing Sheets

(51) Int. Cl.
*F24F 3/153* (2006.01)
*G05D 23/19* (2006.01)

(52) U.S. Cl.
CPC ......... *F24F11/0015* (2013.01); *F24F 11/0076* (2013.01); *F24F 11/0079* (2013.01); *G05D 23/1917* (2013.01); *F24F 2011/0047* (2013.01); *Y02B 30/746* (2013.01)

(56) References Cited

U.S. PATENT DOCUMENTS

| | | | |
|---|---|---|---|
| 5,303,561 A * | 4/1994 | Bahel et al. | 62/186 |
| 5,353,862 A * | 10/1994 | Akiyama | 165/229 |
| 5,381,669 A * | 1/1995 | Bahel et al. | 62/129 |
| 5,450,893 A * | 9/1995 | Galba et al. | 236/44 A |
| 5,475,986 A * | 12/1995 | Bahel et al. | 236/51 |
| 5,538,471 A * | 7/1996 | Guiles, Jr. | 454/238 |
| 6,926,079 B2 * | 8/2005 | Kensok et al. | 165/222 |
| 6,978,631 B2 * | 12/2005 | Fuller | 236/44 C |
| 7,516,106 B2 * | 4/2009 | Ehlers et al. | 705/412 |
| 7,979,163 B2 * | 7/2011 | Terlson et al. | 236/49.3 |
| 8,104,299 B2 * | 1/2012 | Okamoto et al. | 62/160 |
| 8,256,689 B2 * | 9/2012 | Matsubara | 236/44 C |
| 2005/0033707 A1 * | 2/2005 | Ehlers et al. | 705/412 |
| 2006/0004492 A1 * | 1/2006 | Terlson et al. | 700/276 |
| 2007/0225868 A1 * | 9/2007 | Terlson et al. | 700/276 |
| 2009/0229294 A1 * | 9/2009 | Matsui | 236/44 A |
| 2010/0281895 A1 * | 11/2010 | Okamoto et al. | 62/160 |
| 2012/0012285 A1 * | 1/2012 | Okamoto et al. | 165/110 |
| 2012/0220026 A1 * | 8/2012 | Okusa et al. | 435/289.1 |

FOREIGN PATENT DOCUMENTS

| | | |
|---|---|---|
| JP | 2-306045 A | 12/1990 |
| JP | 4-332331 A | 11/1992 |
| JP | 7-4724 A | 1/1995 |
| JP | 2010-242995 A | 10/2010 |
| JP | 2012-243005 A | 10/2012 |

OTHER PUBLICATIONS

International Preliminary Report of corresponding PCT Application No. PCT/JP2012/083586 dated Jul. 10, 2014.
European Search Report of corresponding EP Application No. 12 86 3585.1 dated Dec. 11, 2015.

* cited by examiner

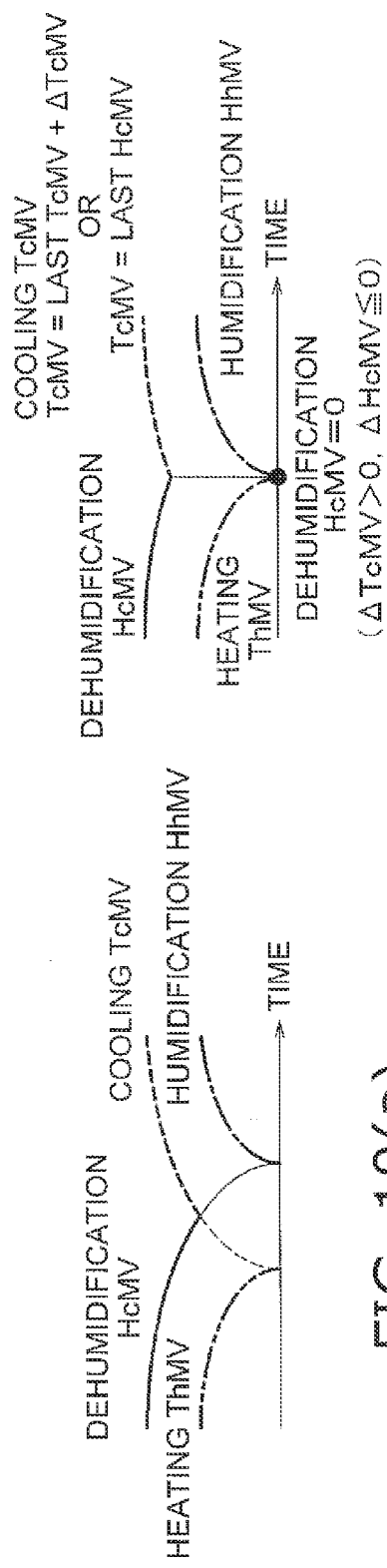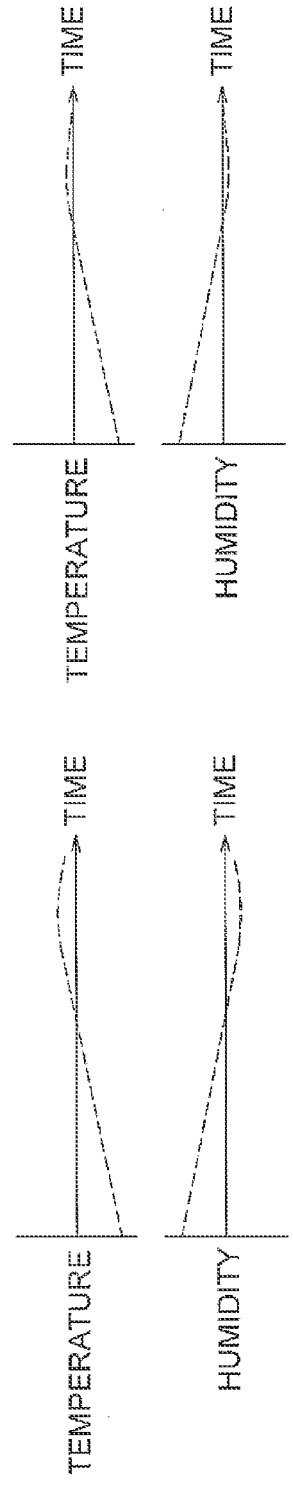
FIG. 10(a)
FIG. 10(b)
FIG. 10(c)
FIG. 10(d)

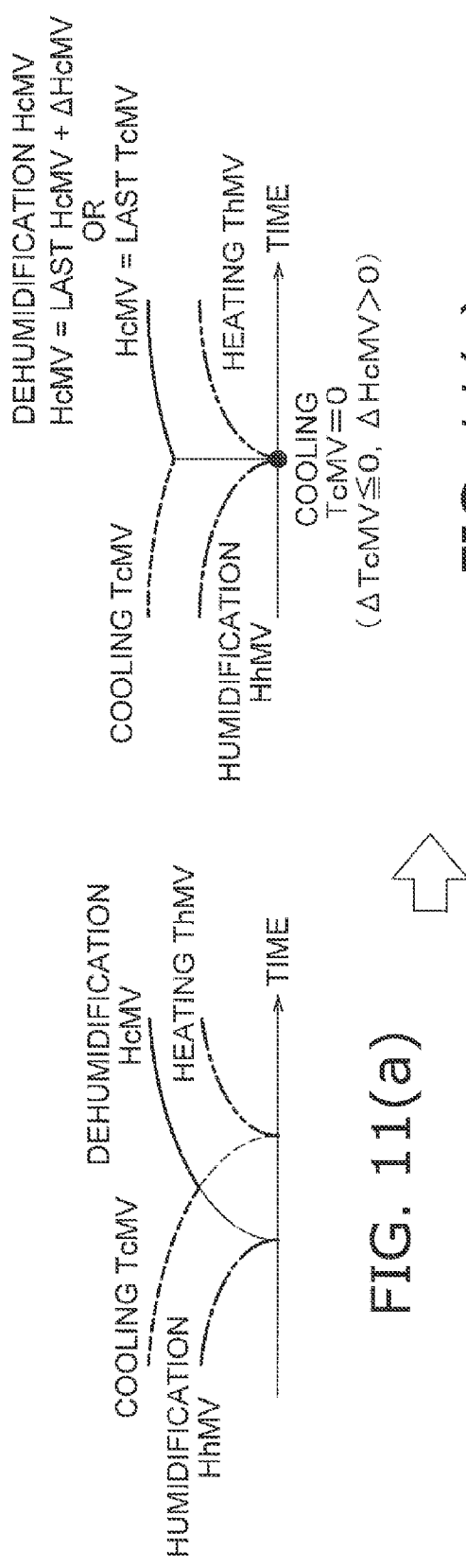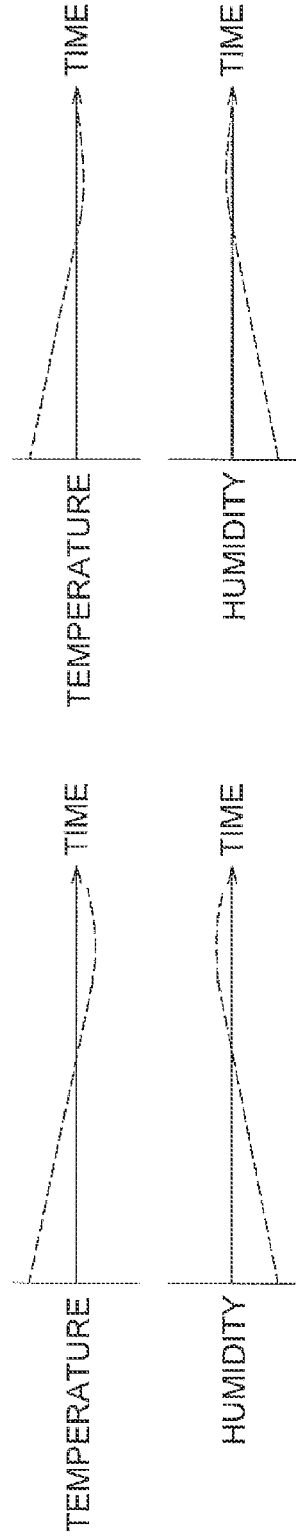

AIR CONDITIONING SYSTEM FOR ADJUSTING TEMPERATURE AND HUMIDITY

CROSS-REFERENCE TO RELATED APPLICATIONS

This U.S. National stage application claims priority under 35 U.S.C. §119(a) to Japanese Patent Application No. 2011-290074, filed in Japan on Dec. 28, 2011, the entire contents of which are hereby incorporated herein by reference.

TECHNICAL FIELD

The present invention relates to an air conditioning system for adjusting temperature and humidity.

BACKGROUND ART

Air conditioning systems capable of adjusting the humidity as well as the temperature of an object space have been known previously. For example, Japanese Laid-open Patent Application 2010-243005 has disclosed an air conditioning system set up in a semiconductor factory or the like. This air conditioning system cools air supplied indoors in an air conditioning unit by a cooling heat exchanger through which cold water supplied by a chiller unit circulates as a heat exchanging medium, and cools and dehumidifies the air. This air conditioning system can also heat air by an electric heater and humidify air by a sprinkler to adjust the temperature and the humidity by a combination of cooling, dehumidification, heating, and humidification.

SUMMARY

Technical Problem

Japanese Laid-Open Patent Application 2010-243005 has disclosed an air conditioning system having a so-called reheating and dehumidifying operation in which a cooling heat exchanger cools and dehumidifies 30° C. air to 10° C., an electric heater heats the cooled/dehumidified air, and a fan supplies the air to an indoor space. The reheating and dehumidifying operation, in which air, after cooling enough to dehumidify, is reheated by an electric heater because the air has dropped below a target temperature, is necessary for adjusting the temperature while ensuring dehumidification performance. The reheating and dehumidifying operation, however, increases electric power consumption due to reheating by an electric heater.

The problem addressed by the present invention is to reduce the quantity of reheating and to reduce energy consumption in an air conditioning system for adjusting temperature and humidity.

Solution to Problem

An air conditioning system according to a first aspect of the present invention is an air conditioning system for processing a sensible heat load and a latent heat load of an object space to the extent required, and adjusting a temperature and a humidity of the Object space to target levels. This air conditioning system is provided with a cooling heat exchanger, a heater, a fan, and a control unit. A heat exchanging medium for cooling air blown into the object space circulates in the cooling heat exchanger. The cooling heat exchanger exchanges heat between the heat exchanging medium and the air, and cools and dehumidifies the air. The heater heats the air cooled and dehumidified by the cooling heat exchanger. The fan creates the air blown into the object space through the cooling heat exchanger and the heater. The control unit has a cooling adjusting unit, a heating adjusting unit, and a blown air flow volume adjusting unit. The cooling adjusting unit adjusts the quantity of cooling supplied by the heat exchanging medium to the air in the cooling heat exchanger. The heating adjusting unit adjusts the quantity of heating supplied by the heater to the air. The blown air flow adjusting unit adjusts the air flow supplied by the fan. The control unit adjusts the quantity of cooling, the quantity of heating, and the supplied air flow by selecting the second combination in the case that combinations of the quantity of cooling, the quantity of heating, and the supplied air flow capable of processing the sensible heat load and latent heat load requirement include a first combination and a second combination in which the supplied air flow is less than the first combination.

With the air conditioning system according to the first aspect, the cooling heat exchanger handles cooling and dehumidifying air blown into the object space, and the heater handles heating this air. When cold or heat is supplied by the heat exchanging medium to the air in the cooling heat exchanger, the temperature of the air drops, and moisture contained in the air condenses and causes the humidity to drop, Therefore, a phenomenon occurs in which the sensible heat load of the object space is processed at or above the requirement associated with dehumidifying air for processing the latent heat load of the object space as much as the requirement, causing the temperature of the air to drop too much. In this case, however, the heater reheats the air to process the sensible heat load and latent heat load of the object space as much as the requirement. When processing the latent heat load of the object space as much as the requirement is considered, a lesser quantity of cooling supplied by the heat exchanging medium to the air per unit time in the cooling heat exchanger is acceptable in the case that the supplied air flow is plentiful, but a great quantity of cooling supplied to the air per unit time is required in the case that the supplied air flow is low. Therefore, previously, control for ensuring a certain level of supplied air flow has often been adopted to produce a margin for control. When the supplied air flow is plentiful, however, the ratio of the processing quantity of the sensible heat load to the total sensible heat load and latent heat load processed by the cooling heat exchanger (the sensible heat factor) is greater than when the supplied air flow is low, which increases the processing quantity of the sensible heat load which is processed simultaneously to process the latent heat load. Therefore, the inventors of the present application noted the supplied air flow, and conceived of adjusting the quantity of cooling, the quantity of heating, and the supplied air flow by selecting the second combination in the case that combinations of the quantity of cooling, the quantity of heating, and the supplied air flow capable of processing the sensible heat load and the latent heat load requirement include a first combination and a second combination wherein the supplied air flow is less than this first combination. Thus, even in the case that the cooling heat exchanger in the end processes the sensible heat load of the air at or above the requirement, this excess processing quantity can be reduced. This can reduce the quantity of heating during reheating by the heater to achieve system energy savings.

An example of a method of selecting the quantity of cooling, the quantity of heating, and the supplied air flow of the second combination is a method of preparing model equations or data in advance for the quantity of sensible heat processing (quantity of cooling processing) and the quantity of latent heat processing (quantity of dehumidification processing) of the cooling heat exchanger caused by the supplied air flow and the quantity of cooling, and calculating a quantity of coolant for a supplied air flow which is less than the supplied air flow of the first combination, and is capable of achieving a processing quantity matching the latent heat load.

An air conditioning system according to a second aspect of the present invention is the air conditioning system according to the first aspect, also provided with a cooling device and a heat exchanging medium circuit. The cooling device cools the heat exchanging medium after exchanging heat with the air. The heat exchanging medium circuit has a pump, and circulates the heat exchanging medium between the cooling device and the cooling heat exchanger. The cooling adjusting unit adjusts the quantity of cooling supplied by the heat exchanging medium to the air in the cooling heat exchanger by varying at least one of the quantities of cooling of the heat exchanging medium by the cooling device, and the flow rate of the heat exchanging medium circulating in the cooling heat exchanger.

In the case that the second combination, which has a less supplied air flow and a less quantity of heating, has been selected, the sensible heat load and latent heat load requirement is processed by increasing the quantity of cooling. With the air conditioning system according to the second aspect, however, the quantity of cooling of the heat exchanging medium by the cooling device and/or the flow rate of the heat exchanging medium circulating in the cooling heat exchanger can be increased to increase the quantity of cooling supplied to the air per unit time. For example, in the case that the heat exchanging medium is water, the temperature of the water circulating in the cooling heat exchanger and/or the volume of water can be increased to increase the quantity of cooling per unit time.

An air conditioning system according to a third aspect is the air conditioning system according to the second aspect, wherein the heat exchanging medium circuit also has a flow control valve capable of adjusting the flow rate of the heat exchanging medium. The pump can be adjusted in capacity. The heater is an electric heater capable of varying output in stages. The fan is a fan capable of varying the speed of rotation in stages. The cooling adjusting unit adjusts the flow rate of the heat exchanging medium circulating in the cooling heat exchanger by varying the capacity of the pump and/or the degree of opening of the flow control valve. The heating adjusting unit adjusts the quantity of heating of the air by varying the output of the heater. The blown air flow adjusting unit adjusts the supplied air flow by varying the speed of rotation of the fan.

Because the air conditioning system according to the third aspect is provided with a flow control valve and a pump which can be adjusted in capacity, the flow rate of the heat exchanging medium circulating in the cooling heat exchanger per unit time can be adjusted easily. The quantity of heating can be adjusted just by varying the output of the heater, and the supplied air flow can also be easily adjusted by varying the speed of rotation of the fan. Although an electric heater having relatively poor energy efficiency is employed, the quantity of heating during reheating by the heater can be reduced to achieve energy savings for the overall air conditioning system.

An air conditioning system according to a fourth aspect is the air conditioning system according to any of the first to third aspects, wherein the control unit adjusts the quantity of cooling, the quantity of heating, and the supplied air flow by selecting the combination at which the supplied air flow is lowest from among combinations of the quantity of cooling, the quantity of heating, and the supplied air flow capable of processing the sensible heat load and latent heat load requirement.

With the air conditioning system according to the fourth aspect, the combination having lowest supplied air flow is selected, from among combinations of the quantity of cooling, the quantity of heating, and the supplied air flow capable of processing the sensible heat load and latent heat load requirement, in order to make the quantity of heating by the heater as little as possible based on the finding of the inventors of the present application that the sensible heat factor changes according to differences in the supplied air flow. This can greatly reduce the quantity of heating during reheating by the heater to achieve system energy savings.

It should be noted that because the sensible heat load and latent heat load requirement must be processed, unless the load is zero, a certain level of the supplied air flow is required. When the result of constricting the supplied air flow causes not processing the load, the supplied air flow will be increased.

Advantageous Effects of Invention

According to the air conditioning system according to the first aspect of the present invention, the quantity of cooling, the quantity of heating, and the supplied air flow are adjusted by selecting not a first combination, but a second combination having little supplied air flow from among combinations of the quantity of cooling, the quantity of heating, and the supplied air flow capable of processing the sensible heat load and latent heat load requirement. Therefore, even in case that the cooling heat exchanger for dehumidifying the air processes the sensible heat load of the air at or above the requirement, this excess processing quantity can be reduced, thus reducing the quantity of heating during reheating by the heater to achieve system energy savings.

According to the air conditioning system according to the second aspect of the present invention, the quantity of cooling of the heat exchanging medium by the cooling device and/or the flow rate of the heat exchanging medium circulating in the cooling heat exchanger can be increased to increase the quantity of cooling supplied to the air per unit time.

According to the air conditioning system according to the third aspect of the present invention, although an electric heater having relatively poor energy efficiency is employed, the quantity of heating during reheating by the heater can be reduced to achieve energy savings for the overall air conditioning system.

According to the air conditioning system according to the fourth aspect of the present invention, the quantity of heating during reheating by the heater can be greatly reduced to achieve system energy savings.

BRIEF DESCRIPTION OF THE DRAWINGS

FIG. 10(a) is a diagram showing change over time in previous output values during a transition from a first state (dehumidifying and warming operation) to a second state (cooling and humidifying operation), FIG. 10(b) is a diagram showing change over time in previous temperature and humidity during a transition from a first state (dehumidifying and warming operation) to a second state (cooling and humidifying operation), FIG. 10(c) is a diagram showing change over time in output values during a transition from a first state (dehumidifying and warming operation) to a second state (cooling and humidifying operation), and FIG. 10(d) is a diagram showing change over time in temperature and humidity during a transition from a first state (dehumidifying and warming operation) to a second state (cooling and humidifying operation);

FIG. 11(a) is a diagram showing change over time in previous output values during a transition from a second state (cooling and humidifying operation) to a first state (dehumidifying and warming operation), FIG. 11(b) is a diagram showing change over time in previous temperature and humidity during a transition from a second state (cooling and humidifying operation) to a first state (dehumidifying and warming operation), FIG. 11(c) is a diagram showing change over time in output values during a transition from a second state (cooling and humidifying operation) to a first state dehumidifying and warming operation), and FIG. 11(d) is a diagram showing change over time in temperature and humidity during a transition from a second state (cooling and humidifying operation) to a first state (dehumidifying and warming operation);

DESCRIPTION OF EMBODIMENTS

(1) Overall Configuration of Air Conditioning System

Figure 1:
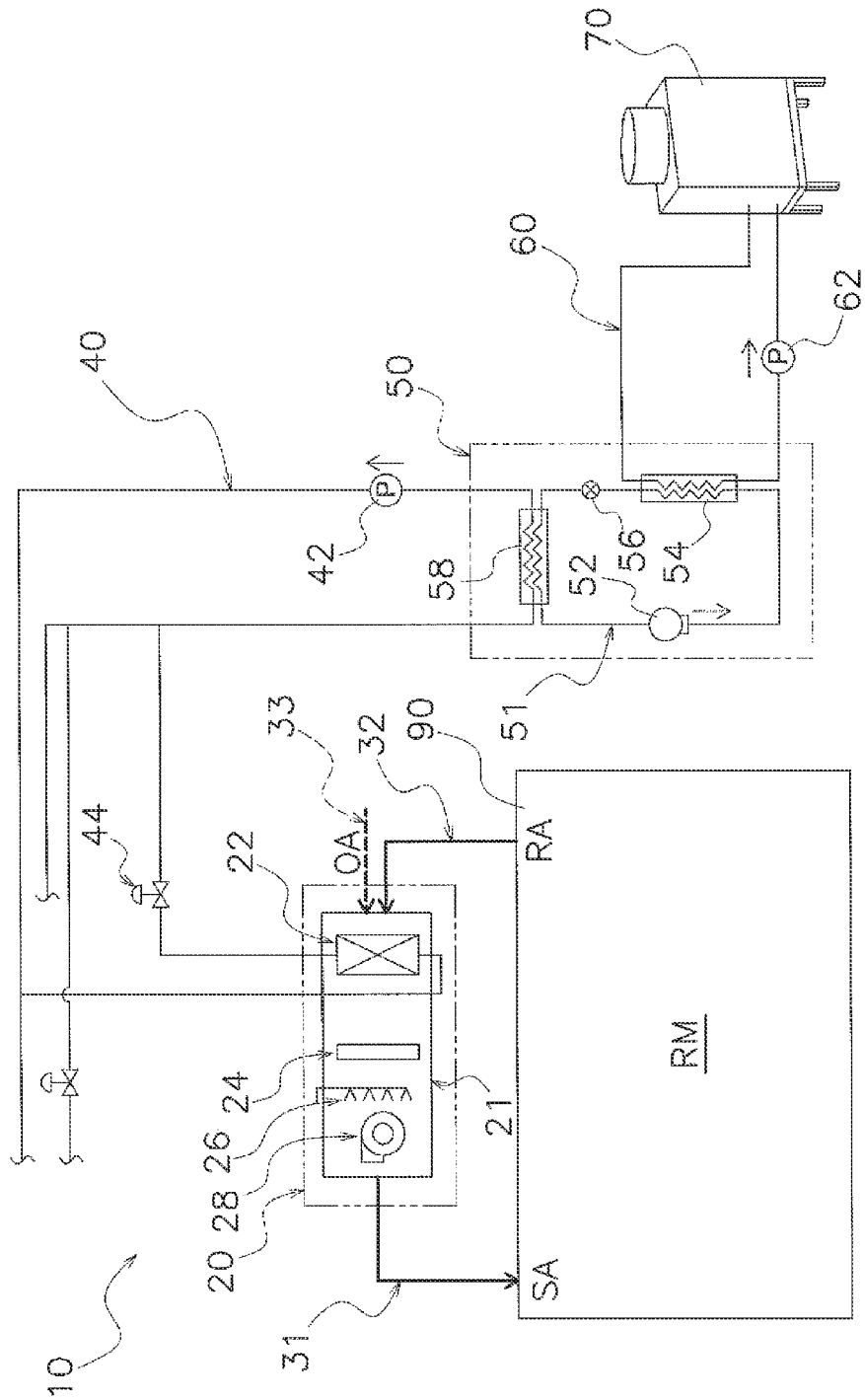
FIG. 1 is a schematic diagram of an air conditioning system accord ng to an embodiment of the present invention.

An air conditioning system 10 according to an embodiment of the present invention is a system is set up in a clean room of a semiconductor factory or the like, and is configured so as to be capable of processing the sensible heat load and latent heat load of an indoor space RM to the extent required, and adjusting the humidity and temperature of the indoor space RM. As shown in FIG. 1, the air conditioning system 10 takes in indoor air RA from the indoor space RM, and after adjusting the humidity and/or the temperature, delivers the air to the indoor space RA as supply air SA. The air conditioning system 10 is mainly provided with a chiller unit 50 and an air conditioning unit 20, and has a coolant circuit 51, a heat radiation circuit 60, and a heat exchanging medium circuit 40.

(2) Detailed Configuration of Air Conditioning System

(2-1) Coolant Circuit

The coolant circuit 51 is included in the chiller unit 50, and is a closed circuit for circulating coolant to execute a vapor compression refrigerating cycle. A compressor 52, a radiator 54, an expansion valve 56, an evaporator 58, and the like are connected to the coolant circuit 51.

The compressor 52 has adjustable drive capacity. Electric power is supplied to a motor of the compressor 52 through an inverter, Changing the output frequency of the invertor changes the speed of rotation (engine speed) of the motor, and changes the drive capacity of the compressor 52.

The radiator 54 has a first heat transfer pipe connected to the coolant circuit 51 and a second heat transfer pipe connected to the heat radiation circuit 60 and exchanges heat between a coolant circulating in the first heat transfer pipe on the coolant circuit 51 side and a heat exchanging medium circulating in the second heat transfer pipe on the heat radiation circuit 60 side.

The evaporator 58 has a first heat transfer pipe connected to the coolant circuit 51 and a second heat transfer pipe connected to the heat exchanging medium circuit 40, and exchanges heat between a coolant circulating in the first heat transfer pipe on the coolant circuit 51 side and a heat exchanging medium circulating in the second heat transfer pipe on the heat exchanging medium circuit 40 side.

(2-2) Heat Radiation Circuit

The heat radiation circuit 60 is filled with water as a heat exchanging medium. The radiator 54 described earlier, a water pump 62, and a cooling tower 70 are connected to the heat radiation circuit 60. The water pump 62 has adjustable discharge flow and circulates the water in the heat radiation circuit 60. The cooling tower 70 cools the water circulating in the heat radiation circuit 60. The arrow by the water pump 62 in FIG. 1 indicates the direction in which water circulates in the heat radiation circuit 60.

(2-3) Heat Exchanging Medium Circuit

The heat exchanging medium circuit 40 comprises a closed circuit filled with water as a heat exchanging medium. The evaporator 58 described earlier, a circulating pump 42, and an air-cooling heat exchanger 22 are connected to the heat exchanging medium circuit 40. The circulating pump 42 can be adjusted in capacity to adjust the discharge flow, and circulates water in the heat exchanging medium circuit 40. The evaporator 58 cools the heat exchanging medium circulating in the heat exchanging medium circuit 40. The arrow by the circulating pump 42 in FIG. 1 indicates the direction in which water circulates in the heat exchanging medium circuit 40.

Although FIG. 1 shows only one air conditioning unit 20 and its air-cooling heat exchanger 22, the heat exchanging medium circuit 40 is linked to the air-cooling heat exchanger 22 and the evaporators 58 of a plurality of air conditioning units, the total flow rate is determined by the discharge flow of the circulating pump 42, and the flow rate of the heat exchanging medium circulating in the air-cooling heat exchanger is determined by the degree of opening of the flow control valve 44.

(2-4) Configuration of Air Conditioning Unit

The air conditioning unit 20 has a casing 21 of a nearly rectangular parallelepiped shape. An Air passage through which air circulates is formed inside the casing 21. One end of the inlet duct 32 is connected to the inflow ends of the air passage. The other end of the inlet duct 32 communicates with the indoor space RM. One end of the supply air duct 31 is connected to the outflow end of the air passage. The other end of the supply air duct 31 communicates with the indoor space RM.

An air-cooling heat exchanger 22, an electric heater 24, a sprinkler-humidifier 26, and a fan 28 are disposed in the air passage inside the casing 21 in this order from the upstream to the downstream side. The electric heater 24 heats the air circulated through the air-cooling heat exchanger 22. The electric heater 24 is a device for raising the temperature of the air, and can change output in stages to regulate the quantity of heating of the air. The sprinkler-humidifier 26 humidifies the air circulating inside the casing 21 by sprinkling water in a tank (not shown) installed on the outside of the casing 21 into the air from a nozzle. The sprinkler-humidifier 26 is a device for raising the humidity of the air, and can regulate the quantity of humidification of the air. The fan 28 is a blower capable of regulating supplied air flow, and can change the speed of rotation in stages by controlling an inverter. The fan 28 generates an air flow for blowing into the indoor space RM through the air-cooling heat exchanger 22, the electric heater 24, and the sprinkler-humidifier 26.

The air-cooling heat exchanger 22 is a device for cooling the air to lower the temperature and for dehumidifying the air to lower the humidity. That is, the air-cooling heat exchanger 22 has both an air cooling function and an air dehumidifying function, and can cool the air to the dew point temperature or lower. The air-cooling heat exchanger 22 has a plurality of heat transfer fins, and a heat transfer pipe transfixing these heat transfer fins, and is a fin-and-tube heat exchanger. As described earlier, cold water, comprising a heat exchanging medium for circulating in the heat exchanging medium circuit 40, circulates in the heat transfer pipe of the air-cooling heat exchanger 22, and cools the air by supplying the coldness of the cold water to the air through the heat transfer pipe and the heat transfer fins.

(2-5) Configuration of Air Conditioning System Controller

The air conditioning system 10 is also provided with an air conditioning system controller 80 as control means. The controller 80 will be described in detail later.

(3) Basic Operation of Air Conditioning System

Next, the drive action of the air conditioning system 10 will be described. The air conditioning system 10 performs air conditioning so that the temperature and humidity of the indoor space RM become 23° C. which is a setting temperature (a target temperature) and 50% which is a setting humidity (a target humidity), for example, by carrying out any of a cooling and dehumidifying operation for cooling and dehumidifying the air (see FIG. 6), a cooling and humidifying operation for cooling and humidifying the air (see FIG. 7), a dehumidifying and warming operation for dehumidifying and heating the air (see FIG. 8), and a warming and humidifying operation for heating and humidifying the air (see FIG. 9).

Figure 6:
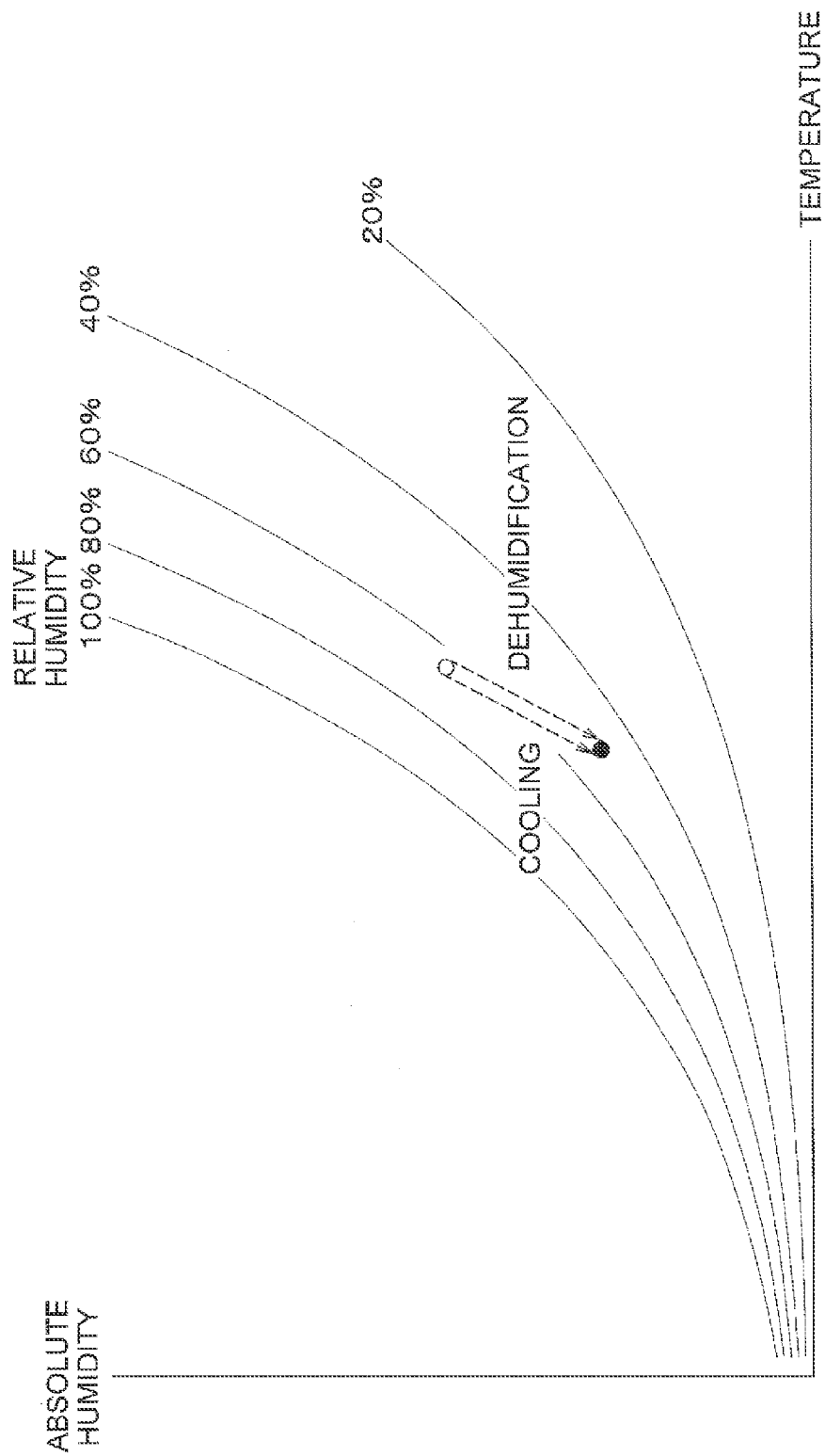
FIG. 6 is a psychrometric chart showing cooling and dehumidification of air during a cooling and dehumidifying operation.

During the cooling and dehumidifying operation shown in FIG. 6, the compressor 52, the water pump 62, the circulating pump 42, and the fan 28 are driven. The electric heater 24 is basically stopped during the cooling and dehumidifying operation, and sprinkling by the sprinkler-humidifier 26 is also stopped. A refrigerating cycle is carried out in the coolant circuit 51 during the cooling and dehumidifying operation. Specifically, in the radiator 54, coolant compressed by the compressor 52 radiates heat and condenses in the water circulating in the heat radiation circuit 60. The coolant cooled by the radiator 54 is reduced in pressure by the expansion valve 56, then evaporated in the evaporator 58 by absorbing heat from the water circulating in the heat exchanging medium circuit 40. The coolant evaporated by the evaporator 58 is drawn into the compressor 52 and compressed. In the cooling tower 70, the water heated by the radiator 54 circulating in the heat radiation circuit 60 releases heat into the outdoor air. In the heat exchanging medium circuit 40, the water cooled by the evaporator 58 in the coolant circuit 51 cools the air circulating in the air passage in the casing 21 in the air-cooling heat exchanger 22. The water passing through the air-cooling heat exchanger 22 is returned to the evaporator 58 of the coolant circuit 51 and cooled again. In the heat exchanging medium circuit 40, the coldness which the water has obtained by the coolant in the evaporator 58 is carried to the air-cooling heat exchanger 22 and supplied to the air. Within the air conditioning unit 20, the indoor air RA taken in by the inlet duct 32 from the indoor space RM circulates in the air passages inside the casing 21. This air is cooled and dehumidified by the water of the heat exchanging medium circuit 40 in the air-cooling heat exchanger 22. The air cooled and dehumidified by the air-cooling heat exchanger 22 passes through the supply air duct 31, and is supplied to the indoor space RM as supply air SA. This cooling and dehumidifying operation is carried out in the case that the sensible heat load and latent heat load of the indoor air are processed exactly as much as the requirement by cooling and dehumidifying by the air-cooling heat exchanger 22 and there is no need to reheat and humidify the air.

Figure 7:
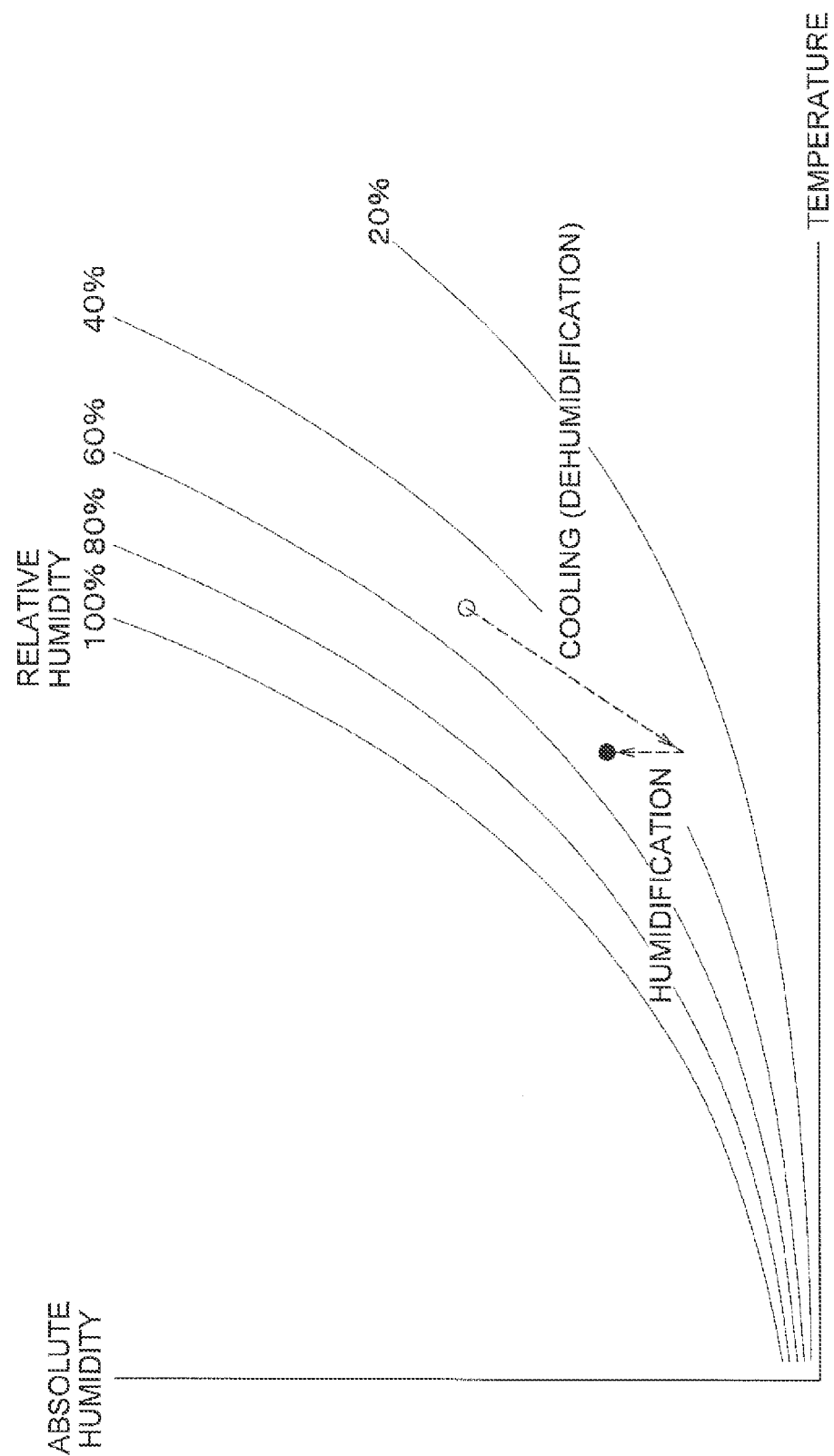
FIG. 7 is a psychrometric chart showing cooling and dehumidification of air during a cooling and humidifying operation.

The cooling and humidifying operation shown in FIG. 7 is a humidifying operation of sprinkling water by the sprinkler-humidifier 26 in addition to the cooling and dehumidifying operation. From cooling to dehumidifying air by the water in the heat exchanging medium circuit 40 in the air-cooling heat exchanger 22 are the same as the cooling and dehumidifying operation described earlier, then water is sprinkled on this cooled and dehumidified air by the sprinkler-humidifier 26. This cooling and humidifying operation is an operation which achieves the setting temperature by cooling and dehumidifying by the air-cooling heat exchanger 22, and is carried out in the case that the humidity of the indoor space RM drops below the setting humidity due to the dehumidification effect associated with cooling.

Figure 8:
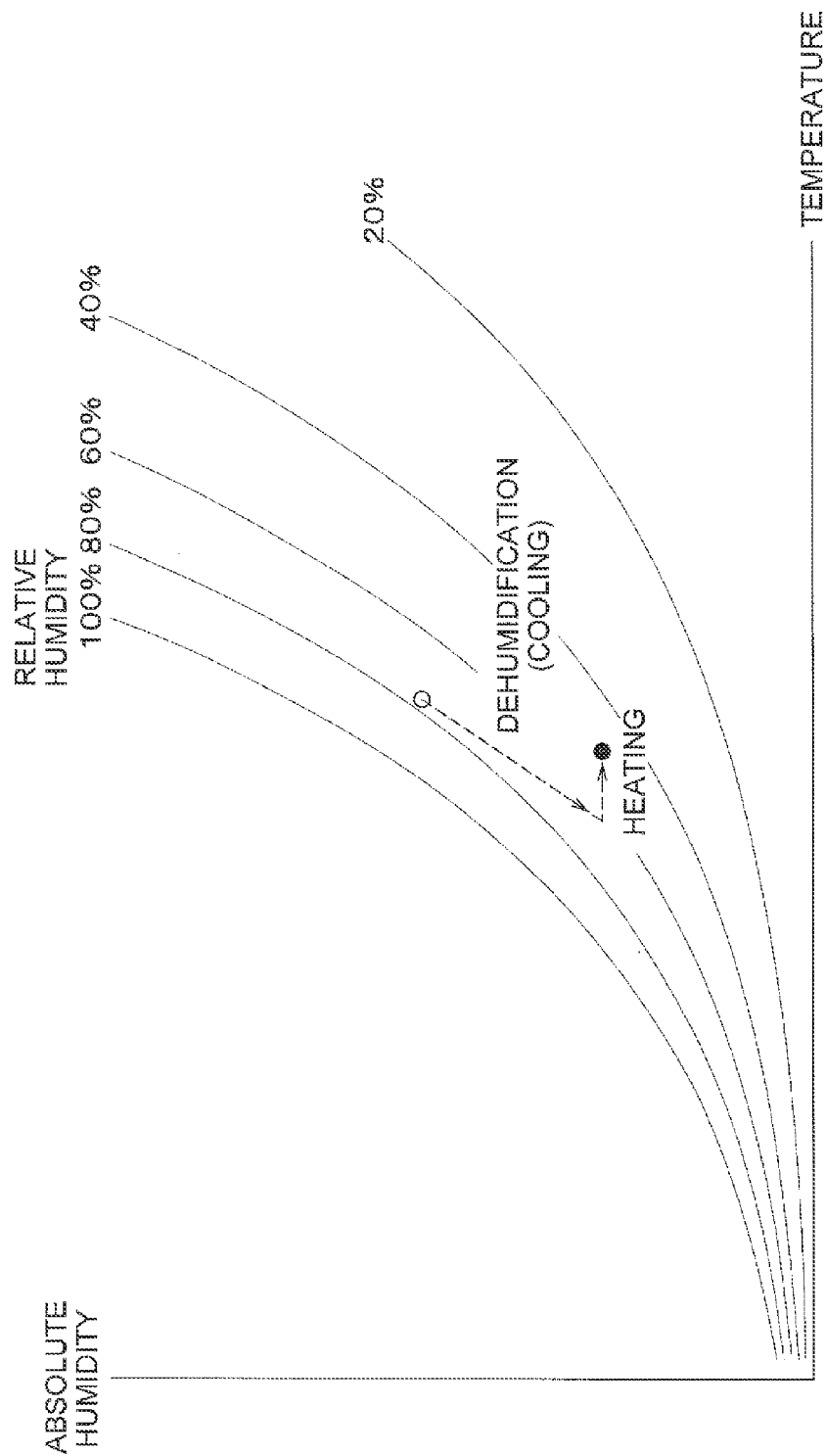
FIG. 8 is a psychrometric chart showing cooling and dehumidification of air during a dehumidifying and warming operation.

The dehumidifying and warming operation shown in FIG. 8, also called a reheating and dehumidifying operation, is an operation which is carried out in the case that the temperature of the indoor space RM drops below the setting temperature due to the cooling effect associated with dehumidifying even though the setting humidity is achieved by dehumidifying and cooling by the air-cooling heat exchanger 22. With this dehumidifying and warming operation, the electric heater 24 is operated to reheat the air in the case that a great quantity of cooling is supplied in the air-cooling heat exchanger 22 for dehumidifying the air, and the air has been cooled more than necessary.

Figure 9:
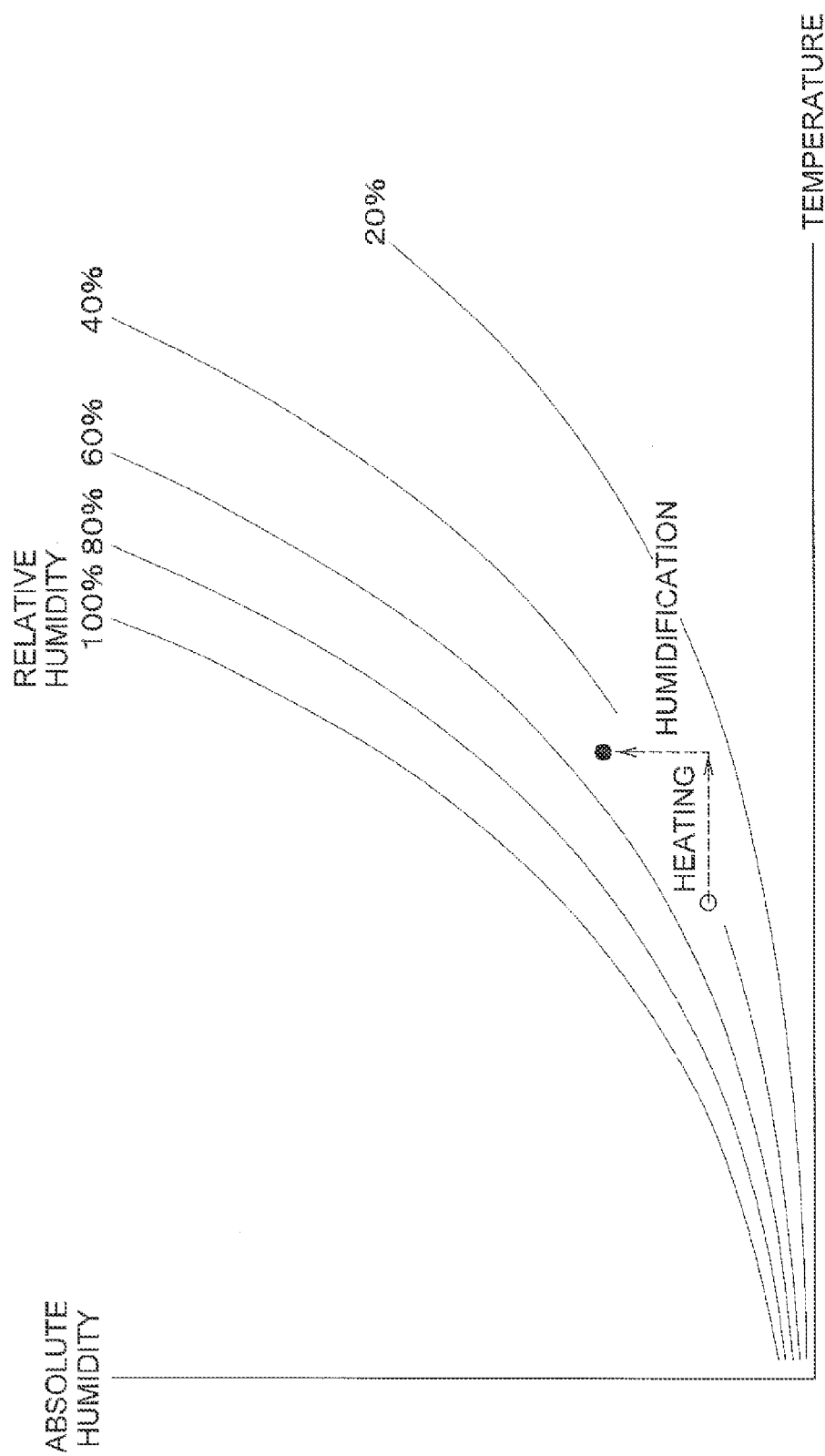
FIG. 9 is a psychrometric chart showing cooling and dehumidification of air during a warming and humidifying operation.

In the warming and humidifying operation shown in FIG. 9, operations of the electric heater 24, the sprinkler-humidifier 26, and the fan 28 are carried out. On the other hand, the compressor 52, the water pump 62, and the circulating pump 42 are stopped. With the warming and humidifying operation, the air taken in from the indoor space RM is first heated by the electric heater 24 in the air conditioning unit 20, then humidified by the sprinkler-humidifier 26 to supply to the indoor space RM as supply air SA.

(4) Detailed Control of Air Conditioning System by Controller

Figure 2:
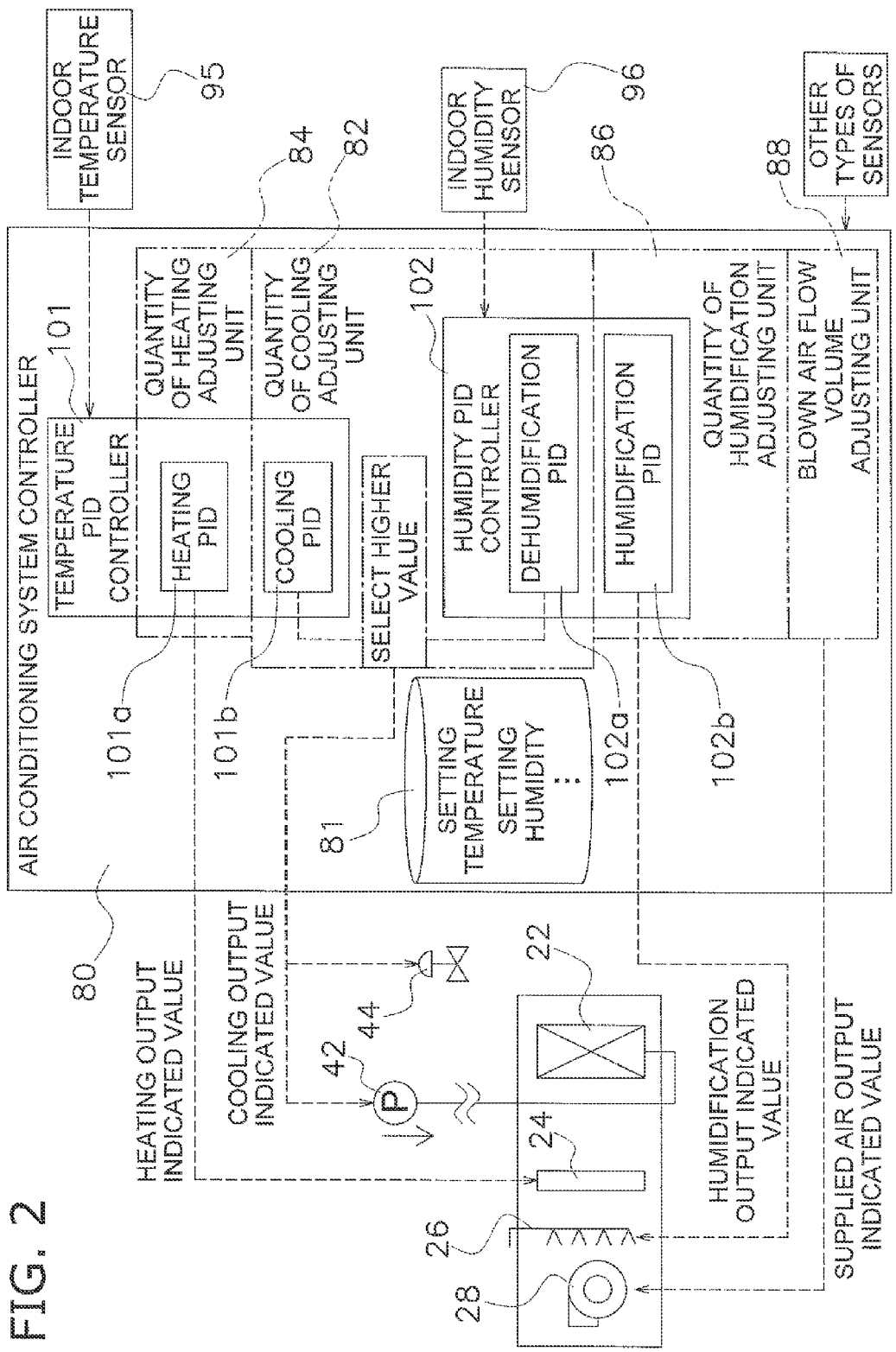
FIG. 2 is a block diagram of a controller of an air conditioning system.

The basic operation of the air conditioning system is controlled by the controller 80 shown in FIG. 2. The controller 80 provided to the air conditioning system 10 as control means specifically controls the compressor 52, the expansion valve 56, the water pump 62, the circulating pump 42, the flow control valve 44, the electric heater 24, the sprinkler-humidifier 26, the fan 28, and the like. Although the controller 80 controls the devices of the coolant circuit 51 of the chiller unit 50 and the heat radiation circuit 60 as well as the devices of the air conditioning unit 20 and/or the heat exchanging medium circuit 40, the description here will focus on control of the devices of the air conditioning unit 20 and the heat exchanging medium circuit 40. During control of the devices of the coolant circuit 51 and/or the heat radiation circuit 60, the output and/or the degree of opening of the compressor 52, the expansion valve 56, and the water pump 62 are regulated so as to bring the temperature of the cold water flowing out from the evaporator 58 in the heat exchanging medium circuit 40 to a target level. The present description, however, is premised on controlling the temperature of the cold water to a constant target level.

As shown in FIG. 2, the controller 80 receives inputs from an indoor temperature sensor 95 for measuring the temperature of the air in the indoor space RM, an indoor humidity sensor 96 for measuring the humidity of the air in the indoor space RM, and various other sensors, and controls the electric heater 24, the sprinkler-humidifier 26, and the fan 28 of the air conditioning unit 20 and/or the circulating pump 42 and the flow control valve 44 of the heat exchanging medium circuit 40. The controller 80 also has a memory 81 as a memory unit. This memory 81 stores a setting temperature and a setting humidity of the indoor space RM inputted by a user.

The controller 80 controls devices by a CPU executing a program written in the memory 81 or the like, and the program executed by the CPU gives the controller 80 various functions. As shown in FIG. 2, these functions of the controller 80 will be called a cooling adjusting unit 82, a heating adjusting unit 84, a quantity of humidification adjusting unit 86, and a blown air flow volume adjusting unit 88. The controller 80 is also represented in FIG. 2 as including two PID controllers. Of these two, a controller which is inputted the setting temperature and the measurement value of the indoor temperature by the indoor temperature sensor 95, and outputs a cooling demand output value TcMV and/or a heating demand output value ThMV, is called a temperature PID controller 101, and a controller which is inputted the setting humidity and the measurement value of the indoor humidity by the indoor humidity sensor 96, and outputs a dehumidification demand output value HcMV and/or a humidification demand output value HhMV, is called a humidity PID controller 102. The temperature PhD controller 101 includes a heating PID 101a for outputting the heating demand output value ThMV, and a cooling PID 101b for outputting the cooling demand output value TcMV. The humidity PID controller 102 includes a dehumidification PID 102a for outputting the dehumidification demand output value HcMV, and a humidification ND 102b for outputting the humidification demand output value HhMV. The cooling adjusting unit 82 delivers the higher value of the cooling demand output value TcMV and the dehumidification demand output value HcMV to the circulating pump 42 and the flow control valve 44 as a cooling output indicated value. The heating adjusting unit 84 delivers the heating demand output value ThMV to the electric heater 24 as a heating output indicated value. The quantity of humidification adjusting unit 86 delivers the humidification demand output value HhMV to the sprinkler-humidifier 26 as a humidification output indicated value. The blown air flow adjusting unit 88 delivers a supplied air output indicated value to the fan 28.

(4-1) Determination of Cooling Demand Output Value and Heating Demand Output Value by Temperature PID Controller The temperature PID controller 101 is a PID controller provided with a control input (PV), a setting input (SV) and a control output (MV), and is a device for computing using a standard PID control basic formular. The PID controller is inputted a current temperature PVt, which is the measurement value of the indoor temperature by the indoor temperature sensor 95, as the control input (PV) and a setting temperature SVt stored in the memory 81 as the setting input (SV), and outputs the cooling demand output value TcMV and the heating demand output value ThMV as control outputs (MV).

Figure 3:
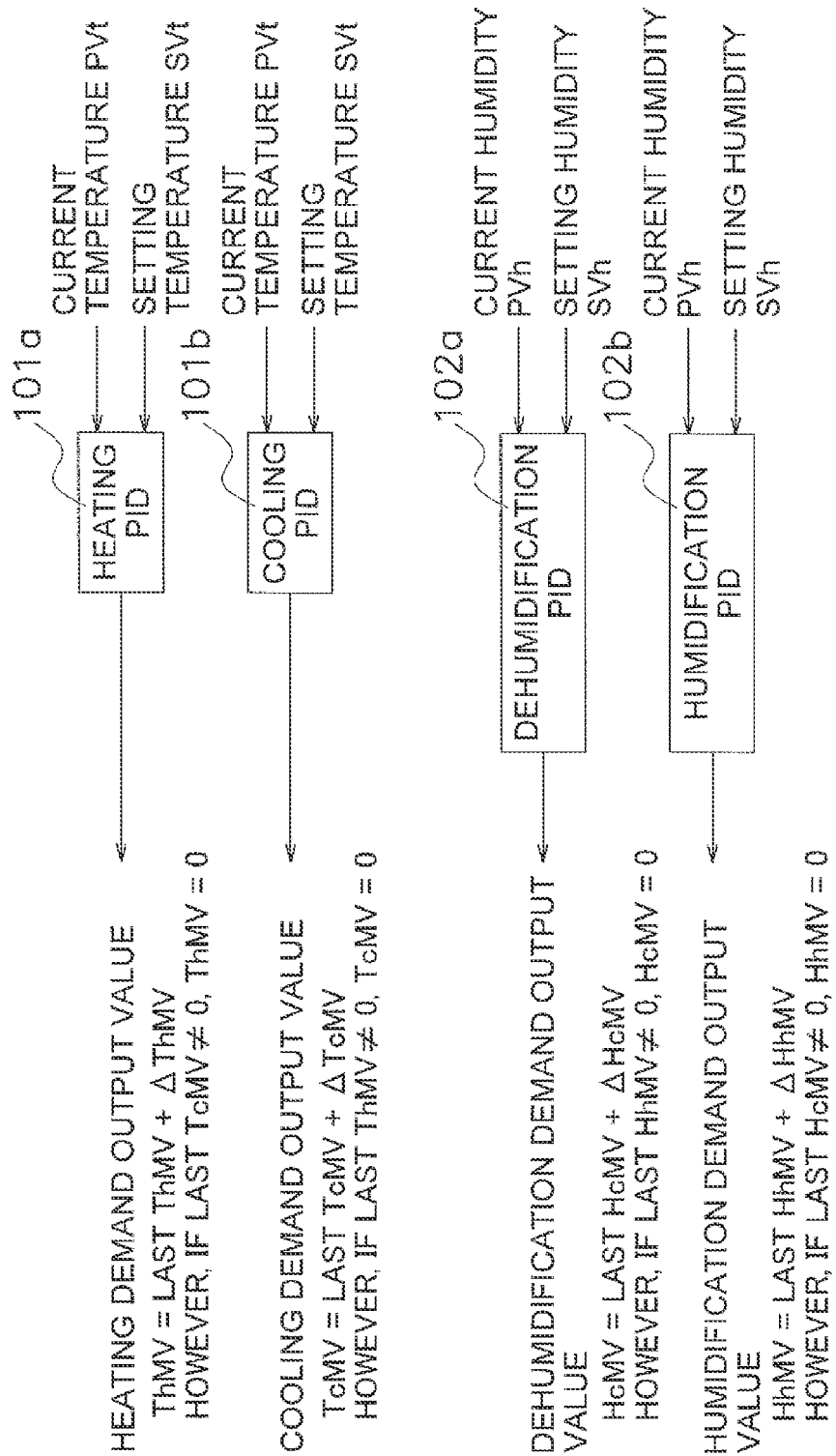
FIG. 3 is a diagram showing inputs and outputs of PIDs.

As shown in FIG. 3, the temperature PID controller 101 uses a PID control logic combining a proportional action (P-action), an integral action (I-action), and a derivative action (D-action) to compute the cooling demand output value TcMV and the heating demand output value ThMV on the basis of the deviation between the setting temperature SVt and the current temperature PVt measured by the indoor temperature sensor 95. The following Equations 1 and 2 are used in the (Pit) control logic. Equation 2 is an arithmetic expression of the PID action.

$$u(n)=u(u-1)+\Delta u(n) \quad \text{(Equation 1)}$$

$$\Delta u(n)=Kp \times [e(n)-e(n-1)]+(T/Tl) \times e(n)+(TD/T) \times [e(n)-2 \times e(n-1)+e(n-2)] \quad \text{(Equation 2)}$$

u(n) represents an output value calculated by the current sensible heat load calculation, u(n−1) represents an output value calculated by the previous sensible heat load calculation, and Δu(n) represents a correction value. Kp represents proportional gain, Tl represents integral time, TD represents derivative time, and T represents a time step. e(n) represents the difference between the setting temperature and the measurement value by the indoor temperature sensor 95 during the current sensible heat load calculation, e(n−1) represents the difference between the setting temperature and the measurement value by the indoor temperature sensor 95 during the previous sensible heat load calculation, and e(n−2) represents the difference between the setting temperature and the measurement value by the indoor temperature sensor 95 during the sensible heat load calculation before that.

(4-2) Determination of Dehumidification Demand Output Value and Humidification Demand Output Value by Humidity PID Controller The humidity PID controller 102 is a PID controller like the temperature PID controller 101, and is inputted a current humidity PVh, which is a measurement value of the indoor humidity by the indoor humidity sensor 96, as the control input (PV) and a setting humidity SVh stored by the memory 81 as the setting input (SV), and outputs the dehumidification demand output value HcMV and the humidification demand output value HhMV as control outputs (MV).

As shown in FIG. 3, the humidity PID controller 102 uses a PID control logic like that of the temperature PID controller 101 to compute the dehumidification demand output value HcMV and the humidification demand output value HhMV on the basis of the deviation between the setting humidity SVh and the current humidity PVh measured by the indoor humidity sensor 96. The computation method is like that of the temperature PID controller 101, and will not be described again.

(4-3) Correction of Cooling Demand Output Value and Dehumidification Demand Output Value by Cooling Adjusting Unit The cooling adjusting unit 82 is a functional part of the controller 80 disposed for regulating the quantity of cooling supplied by the heat exchanging medium to the air in the air-cooling heat exchanger 22, and delivers the cooling output indicated value to the circulating pump 42 and the flow control valve 44, and regulates the flow rate of the heat exchanging medium circulating in the air-cooling heat exchanger 22. Since the present description is premised on controlling the temperature of the cold water flowing out from the evaporator 58 in the heat exchanging medium circuit 40 to a constant target level, the quantity of cooling supplied by the heat exchanging medium to the air in the air cooling heat exchanger 22 varies depending on the flow rate of the heat exchanging medium (cold water) circulating in the air-cooling heat exchanger 22.

As described earlier, the higher value of the cooling demand output value TcMV and the dehumidification demand output value HcMV is sent by the cooling adjusting unit 82 to the circulating pump 42 and the flow control valve 44 as a cooling output indicated value. Before this, however, the cooling adjusting unit 82 corrects the cooling demand output value TcMV and the dehumidification demand output value HcMV.

Figure 4:
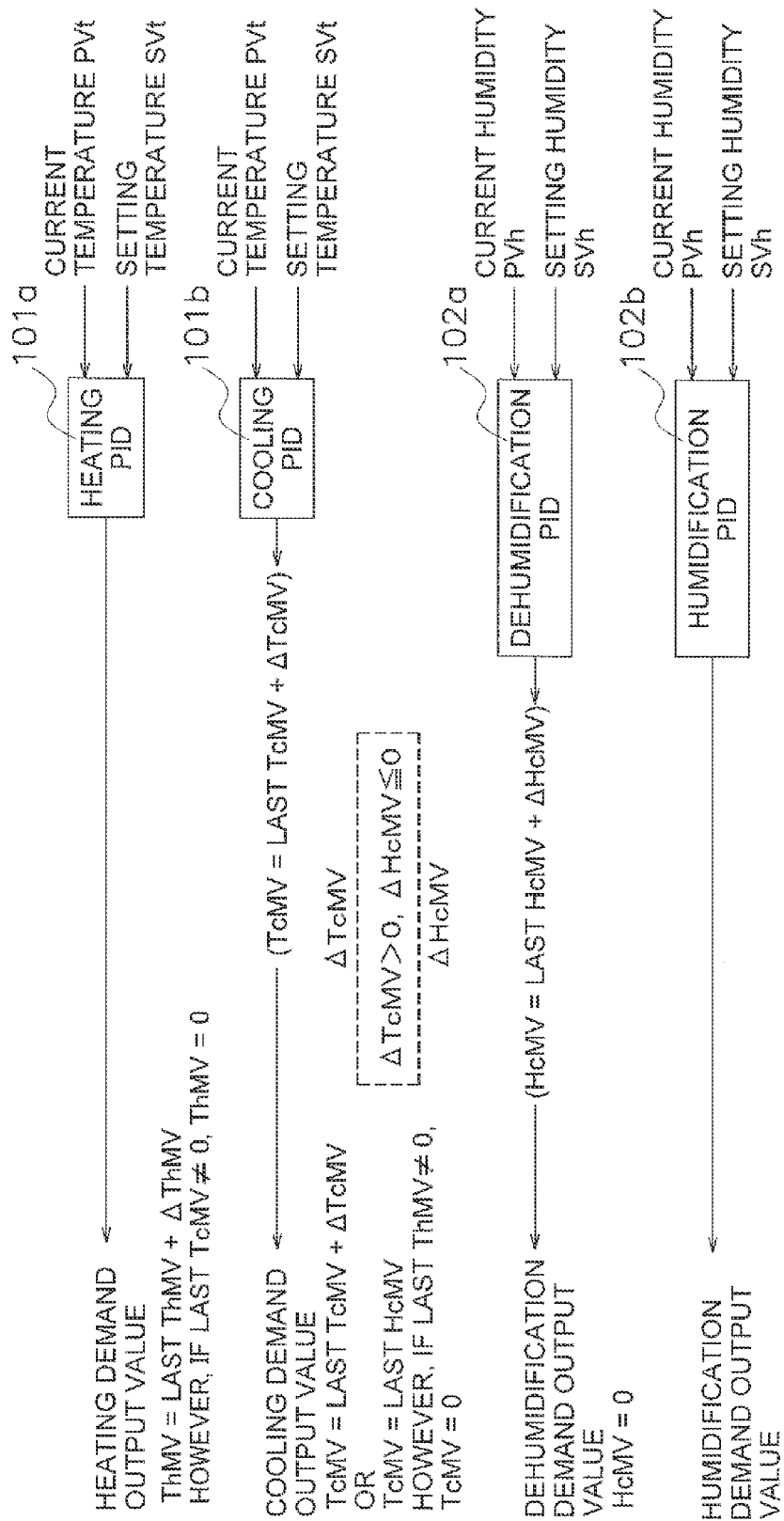
FIG. 4 is a diagram showing correction based on results comparing incremental output values of PIDs.
Figure 5:
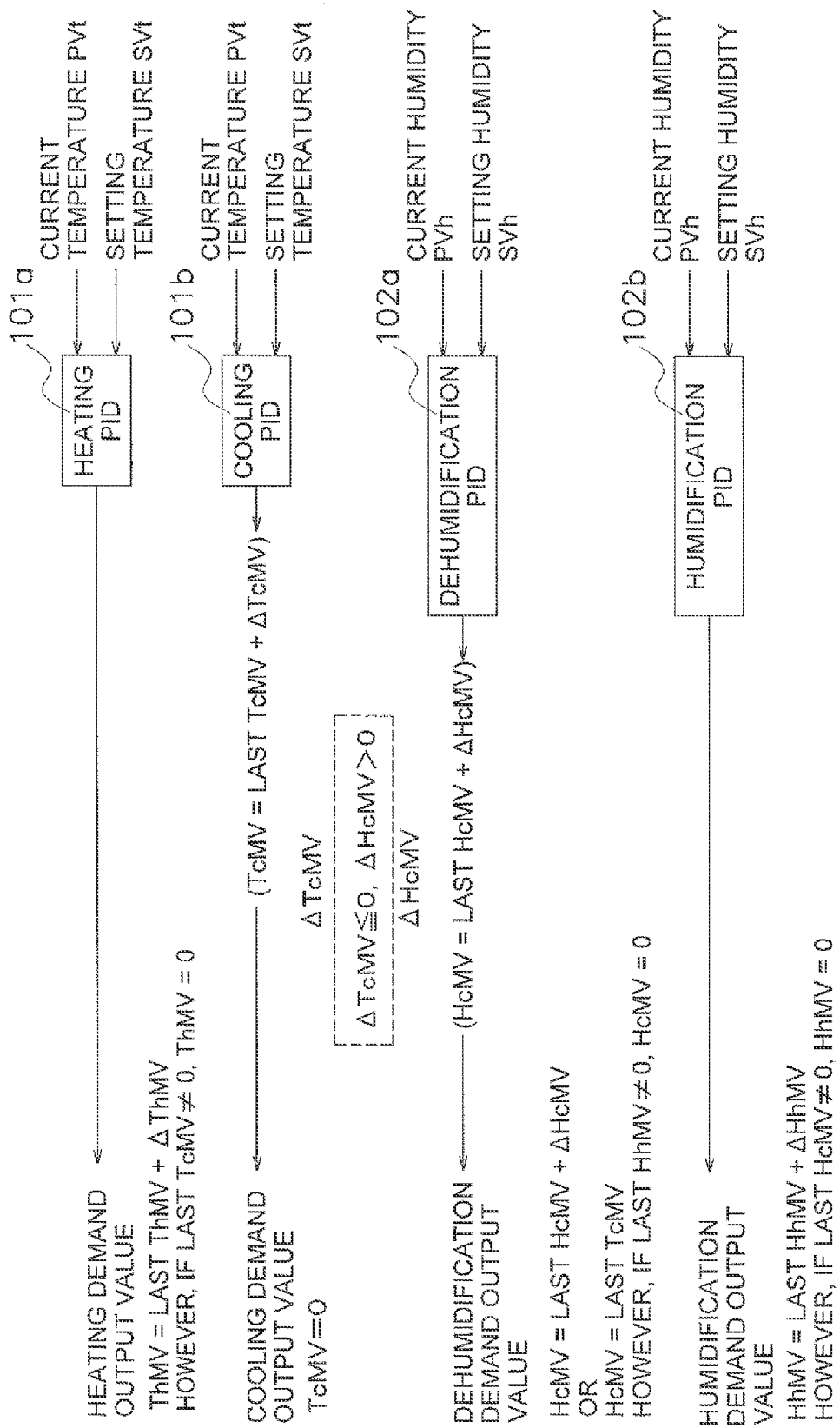
FIG. 5 is a diagram showing correction based on results comparing incremental output values of PIDs.

(4-3-1) Correction by Heating Demand Output Value and Humidification Demand Output Value Because the cooling demand output value TcMV and the heating demand output value ThMV are values related to conflicting demands, the values are corrected by the cooling adjusting unit 82 so that whenever one value is not zero, the other value is zero (see FIGS. 3-5).

Because the dehumidification demand output value HcMV and the humidification demand output value HhMV are values related to conflicting demands, the values are corrected by the cooling adjusting unit 82 so that whenever one value is not zero, the other value is zero.

(4-3-2) Correction Based on Results Comparing Increment Value

As described earlier, whenever one of the cooling demand output value TcMV and the heating demand output value ThMV is not zero, no value is entered for the other. Therefore, when moving from the dehumidifying and warming operation to the cooling and humidifying operation due to variation in the load of the indoor space RM, a situation may be imagined in which the humidifying action is delayed, allowing the humidity of the indoor space RM to drop greatly below the setting humidity (see FIGS. 10(*a*) and 10(*b*)). Conversely, when moving from the cooling and humidifying operation to the dehumidifying and warming operation, a situation may be imagined in which the heating action is delayed, allowing the temperature of the indoor space RM to drop greatly below the setting temperature (see FIGS. 11(*a*) and 11(*b*)). In such situations, an extra operation of the sprinkler-humidifier 26 for humidifying and/or the electric heater 24 for heating is required, resulting in needless consumption of energy.

To avoid such situations, the dehumidification demand output value HcMV is made zero in the case that an increment value ΔTcMV of the cooling demand output value TcMV is greater than zero and an increment value ΔHcMV of the dehumidification demand output value HcMV is zero or less (see FIG. 4). Similarly, the cooling demand output value TcMV is made zero in the case that an increment value ΔTcMV of cooling demand output value TcMV is zero or less and an increment value ΔHcMV of the dehumidification demand output value HcMV is greater than zero (see FIG. 5).

With regard to the cooling demand output value TcMV and the dehumidification demand output value HcMV, both of which are control parameters of the air-cooling heat exchanger 22, the increment value ΔTcMV and the increment value ΔHcMV may be monitored to determine which of cooling or dehumidifying should predominate. On the basis of such a new finding by the present applicants, besides making the dehumidification demand output value HcMV zero in the case that the increment value ΔTcMV of the cooling demand output value TcMV is greater than zero and the increment value ΔHcMV of the dehumidification demand output value HcMV is zero or less, the cooling adjusting unit 82 makes the higher output value of the cooling demand output value TcMV and the dehumidification demand output value HcMV the new cooling demand output value TcMV. Similarly, besides making the cooling demand output value TcMV zero in the case that the increment value ΔTcMV of the cooling demand output value TcMV is zero or less and the increment value ΔHcMV of the dehumidification demand output value HcMV is greater than zero, the cooling adjusting unit 82 makes the higher output value of the cooling demand output value TcMV and the dehumidification demand output value HcMV the new dehumidification demand output value. The higher output value of the cooling demand output value TcMV and the dehumidification demand output value HcMV in this case is the higher output value of the current cooling demand output value TcMV and dehumidification demand output value HcMV, or the higher output value of the last cooling demand output value TcMV or dehumidification demand output value HcMV before the current output value in the case that the last output value is higher.

(4-3-3) Correction Based on Periodic Cooling Load Estimation Process and Dehumidification Load Estimation Process As described earlier, the cooling adjusting unit 82 corrects the cooling demand output value TcMV outputted by the cooling PID 101*b* of the temperature PID controller 101, and the dehumidification demand output value HcMV outputted by the dehumidification PID 102*a* of the humidity PID controller 102. In addition, the cooling adjusting unit 82 corrects the output values on the basis of a cooling load estimation process and a dehumidification load estimation process carried out periodically at a unit interval of several minutes (see time interval Tb in FIG. 12) differing from the PID actions (computations) carried out at a unit interval of several seconds (see time interval Tp in FIG. 12). The cooling load estimation process and the dehumidification load estimation process, and the correction of output value based on these processes, will be described with reference to FIG. 12.

Figure 12:
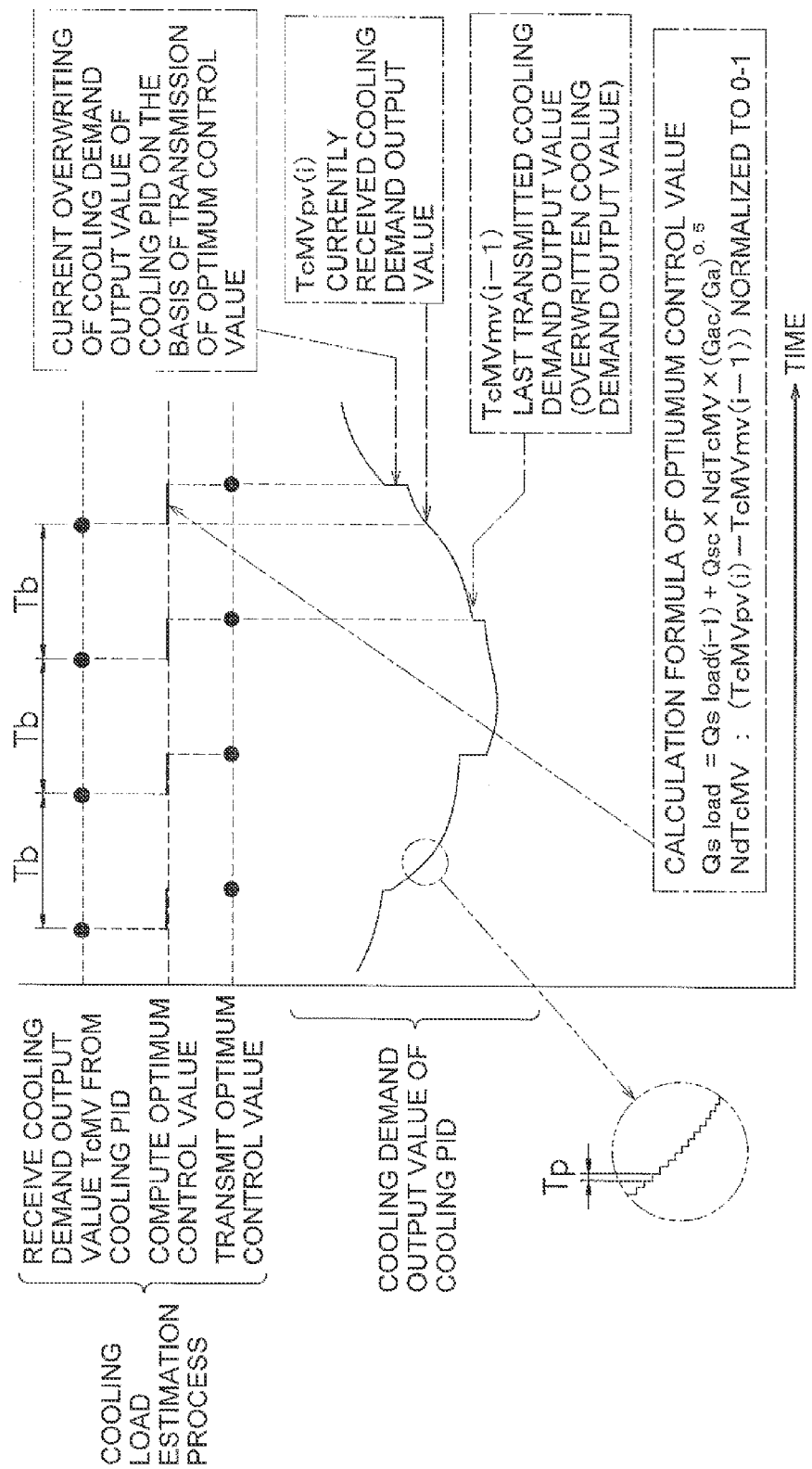
FIG. 12 is a diagram showing a periodic cooling load estimation process and cooling demand output values of a cooling ND.

The cooling adjusting unit 82 periodically estimates the cooling load and the dehumidification load of the indoor space RM, and overwrites the cooling demand output value TcMV and the dehumidification demand output value HcMV on the basis of these estimated loads in the case that it is determined that the cooling demand output value TcMV and the dehumidification demand output value HcMV must be modified, FIG. 12 shows an overview of the estimation process for the cooling load of the indoor space RM and the correction (overwriting) of the cooling demand output value TcMV based on this process. The cooling load estimation process is carried out periodically at a time interval Tb of several minutes. In this estimation process, first, the cooling demand output value TcMV computed by the ND action by the cooling PID 101b is received, and an optimum control value Qs load is calculated. This calculation is carried out using the following equation.

$$Qs\ \text{load} = Qs\ \text{load}(i-1) + Qsc \times NdTcMV \times (Gac/Ga)^{0.5} \quad \text{(Equation 3)}$$

NdTcMV: (TcMVpv(i)−TcMVmv(i−1)) normalized to (0-1)

Qs load (i−1) represents the optimum control value during the last estimation process, and Qsc represents the rated capacity of the air-cooling heat exchanger 22. Because too high a rated capacity Qsc increases the quantity of increase or decrease in load, which may cause hunting, and too small a rated capacity conversely impairs response, a sensible heat capacity value and a latent heat capacity value under the operating temperature and humidity conditions are used. Even in the case that the settings of the air-cooling heat exchanger 22 and/or the chiller unit 50 are excessive, a sensible heat capacity value and a latent heat capacity value based on these excessive settings are used.

TcMVpv(i) represents the current received cooling demand output value TcMV, and TcMVmv(i−1) represents the optimum control value sent to the cooling PID 101b during the last estimation process (the overwritten last cooling demand output value TcMV). In the case that an optimum control value was not transmitted to the cooling RID 101b during the last estimation process, however, TcMVmv(i−1) is the cooling demand output value TcMVpv(i−1) received during the last estimation process.

The square root of (Gac/Ga) is a correction coefficient according to the air flow of the fan 28. Gac represents the rated air volume of the fan 28, and Ga represents the present air volume.

In the case the difference from the cooling demand output value TcMV currently received by the cooling PID 101b is great, the optimum control value Qs load found as described earlier is transmitted to the cooling PID 101b, and the cooling demand output value TcMV is overwritten. In the case that the difference between the optimum control value Qs load and the cooling demand output value TcMV is small, the optimum control value Qs load is not transmitted to the cooling MD 101b, and the cooling demand output value TcMV is not corrected (overwritten).

The inverter frequency of the motor of the circulating pump 42, the degree of opening of the flow control valve 44, and the water supply head and volume of water flowing from the pipe model of the heat exchanging medium circuit 40 to the air-cooling heat exchanger 22 are calculated at the start of control, and the capacity is calculated from the inlet conditions of the air conditioning unit 20 (inlet air volume, and air temperature and humidity) and/or heating and humidification input values to find the current cooling load. When the time delay of the control operation (water supply pressure) is considered, for example, the last Qs load (i−1) other than at the start of control may be found by a similar calculation from the last degree of opening of the flow control valve 44 and the current water supply pressure. For example, it may happen that a control value at a load of 5 kW was transmitted to the circulating pump 42 last time, but produced a capacity of only 4 kW with no increase in the water supply pressure, in spite of which, the temperature of the indoor space RM drops too much and lowers the degree of opening of the flow control valve 44. In such a case, subtracting the increase or decrease in the load from the 5 kW last time to bring the current capacity to 4 kW or greater produces a disturbance factor. Therefore, the last load is substituted for the capacity at the current water supply pressure, and the setting is calculated again.

Next, because the estimation process for the dehumidification load of the indoor space RM and/or correction of the dehumidification demand output value HcMV are the same as the estimation process for the cooling load of the indoor space RM and/or correction of the cooling demand output value TcMV described earlier, only the equation for the optimum control value Ql load will be indicated below.

$$Ql\ \text{load} = Ql\ \text{load}(i-1) + Qlc \times NdHcMV \times (Gac/Ga)^{0.5} \quad \text{(Equation 4)}$$

NdHcMV: (HcMVpv(i)−HcMVmv(i−1)) normalized to (0-1)

Ql load (i−1) represents the optimum control value during the last estimation process, and Qlc represents the rated capacity of the air-cooling heat exchanger 22.

HcMVpv(i) represents the currently received dehumidification demand output value HcMV and HcMVmv(i−1) represents optimum control value transmitted to the dehumidification PID 102a during the last estimation process (the last overwritten dehumidification demand output value HcMV). In the case that the optimum control value was not transmitted to the dehumidification PID 102a during the last estimation process, however, HcMVmv(i−1) is the dehumidification demand output value HcMVpv(i−1) received during the last estimation process.

(4-4) Determination of Cooling Output Indicated Value by Cooling Adjusting Unit

As described earlier, the cooling adjusting unit 82 delivers the higher of the cooling demand output value TcMV and the dehumidification demand output value HcMV to the circulating pump 42 and the flow control valve 44 as the cooling output indicated value. The quantity of the discharge flow of the circulating pump 42 and the degree of opening of the flow control valve 44 are adjusted accordingly to adjust the flow rate of the heat exchanging medium (cold water) circulating in the air-cooling heat exchanger 22.

(4-5) Correction of Heating Demand Output Value by Heating Adjusting Unit

The heating adjusting unit 84 is a functional part of the controller 80 disposed for adjusting the quantity of heating supplied to the air by the electric heater 24, and delivers a heating output indicated value to the electric heater 24.

The heating adjusting unit 84 delivers the heating output indicated value to the electric heater 24 on the basis of the heating demand output value ThMV outputted by the heating PID 101a. Before this, however, the adjusting unit corrects the heating demand output value ThMV.

(4-5-1) Correction by Cooling Demand Output Value

Because the cooling demand output value TcMV and the heating demand output value ThMV are values related to conflicting demands, the heating demand output value ThMV is corrected by the heating adjusting unit 84 so that whenever one value is not zero, the other value is zero (correction to zero) (see FIGS. 3-5).

(4-5-2) Correction Based on Periodic Heating Load Estimation Process

The heating adjusting unit 84 periodically estimates the heating load of the indoor space RM, and overwrites the heating demand output value ThMV in the case that it is determined on the basis of this estimated load that the heating demand output value ThMV must be modified.

Because the estimation process for the heating load of the indoor space RM and/or correction of the heating demand output value ThMV are the same as the estimation process for the cooling load of the indoor space RM and/or correction of the cooling demand output value TcMV described earlier, only the equation for the optimum control value Eload will be indicated below.

$$E\,\text{load} = E\,\text{load}(i-1) + Ec \times NdThMV \quad \text{(Equation 5)}$$

NdThMV: (ThMVpv(i)−ThMVmv(i−1)) normalized to (0-1)

Eload (i−1) represents the optimum control value during the last estimation process, and Ec represents the rated capacity of the electric heater 24.

ThMVpv(i) represents the currently received heating demand output value ThMV, and ThMVmv(i−1) represents the optimum control value transmitted to the heating 101*a* during the last estimation process (the last overwritten heating demand output value ThMV). In the case that the optimum control value was not transmitted to the heating PID 101*a* during the last estimation process, however, ThMVmv(i−1) is the heating demand output value ThMVpv(i−1) received during the last estimation process.

Since the heating capacity of the electric heater 24 is hardly affected by the air flow of the fan 28, the correction coefficient of the square root of (Gac/Ga) used in the estimation process for the cooling load is not used.

(4-6) Determination of Heating Output Indicated Value by Heating Adjusting Unit The heating adjusting unit 84 delivers the heating demand output value ThMV outputted by the heating PID 101*a* to the electric heater 24 as a heating output indicated value. The output of the electric heater 24 is automatically adjusted on the basis of this output value to adjust the quantity of heating supplied to the air by the electric heater 24.

(4-7) Correction of Humidification Demand Output Value by Quantity of Humidification Adjusting Unit The quantity of humidification adjusting unit 86 is a functional part of the controller 80 disposed for adjusting the quantity of humidification supplied to the air by the sprinkler-humidifier 26, and delivers a humidification output indicated value to the sprinkler-humidifier 26.

The quantity of humidification adjusting unit 86 delivers the humidification output indicated value to the sprinkler-humidifier 26 on the basis of the humidification demand output value HhMV outputted by the humidification PID 102*b*. Before this, however, the adjusting unit corrects the humidification demand output value HhMV.

(4-7-1) Correction by Dehumidification Demand Output Value

Because the dehumidification demand output value HcMV and humidification demand output value HhMV are values related to conflicting demands, the humidification demand output value HhMV is corrected by the quantity of humidification adjusting unit 86 so that whenever one value is not zero, the other value is zero (correction to zero) (see FIGS. 3-5),

(4-7-2) Correction Based on Periodic Humidification Load Estimation Process

The quantity of humidification adjusting unit 86 periodically estimates the humidification load of the indoor space RM, and overwrites the humidification demand output value HhMV in the case that it is determined on the basis of this estimated load that the humidification demand output value HhMV must be modified.

Because the estimation process for humidifying of the indoor space RM and/or correction of the humidification demand output value HhMV are the same as the estimation process for the cooling load of the indoor space RM and/or correction of the cooling demand output value TcMV described earlier, only the equation for the optimum control value Kload will be indicated below.

$$K\,\text{load} = K\,\text{load}(i-1) + Kc \times NdHhMV \quad \text{(Equation 6)}$$

NdHhMV: (HhMVpv(i)−HhMVmv(i−1)) normalized to (0-1)

Kload(i−1) represents the optimum control value during the last estimation process, and Kc represents the rated capacity of the sprinkler-humidifier 26.

HhMVpv(i) represents the currently received humidification demand output value HhMV, and HhMVmv(i−1) represents the optimum control value transmitted to the humidification PID 102.*b* during the last estimation process (the last overwritten humidification demand output value HhMV), in the case that the optimum control value was not transmitted to the humidification PID 102*b* during the last estimation process, however, HhMVmv(i−1) is the humidification demand output value HhMVpv(i−1) received during the last estimation process.

Since the humidification capacity of the sprinkler-humidifier 26 is hardly affected by the air flow of the fan 28, the correction coefficient of the square root of (Gac/Ga) used in the estimation process for the cooling load is not used.

(4-8) Determination of Humidification Output Indicated Value by Quantity of Humidification Adjusting Unit The quantity of humidification adjusting unit 86 delivers the humidification demand output value HhMV outputted by the humidification PID 102*b* to the sprinkler-humidifier 26 as a humidification output indicated value. The volume of water sprinkled by the sprinkler-humidifier 26 is automatically regulated on the basis of this indicated value to adjust the quantity of humidification supplied to the air by the sprinkler-humidifier 26.

(4-9) Determination of Supplied Air Output Indicated Value by Blown Air Flow Volume Adjusting Unit The blown air flow volume adjusting unit 88 is a functional part of the controller 80 disposed for adjusting the supplied air flow supplied by the fan 28, and delivers a supplied air output indicated value to the fan 28, which changes the speed of rotation of the fan 28 to adjust the supplied air flow of air blown into the indoor space RM through the air-cooling heat exchanger 22, the electric heater 24, and the sprinkler-humidifier 26. Upon receiving the supplied air output indicated value, the fan 28 regulates the fan step according to this indicated value.

The blown air flow volume adjusting unit 88 selects a second combination in the case that combinations of the quantity of cooling, the quantity of heating, the quantity of humidification, and the supplied air flow capable of processing the sensible heat load and latent heat load requirement of the indoor space RM include a first combination and the second combination wherein the supplied air flow is less than this first combination. On the premise that the supplied air flow of the fan 28 has been determined in this way, the cooling adjusting unit 82, the heating adjusting unit 84, and the quantity of humidification adjusting unit 86 find the cooling demand output value TcMV, the dehumidification demand output value HcMV, the heating demand output value ThMV, and the humidification demand output value HhMV, and determine the cooling output indicated value, the heating output indicated value, and the humidification output indicated value.

Specifically, the blown air flow volume adjusting unit 88 selects the combination wherein the supplied air flow is lowest from among combinations of the quantity of cooling, the quantity of heating, the quantity of humidification, and the supplied air flow capable of processing the sensible heat load and latent heat load requirement, and determines the quantity of cooling, the quantity of heating, and the quantity of humidification on the premise of this supplied air flow.

This is a method for determining the supplied air flow which was discovered when the inventors of the present application noticed that the conventional method caused, for example, a situation such as the following: In the case that the target temperature setting and humidity setting is 23° C. and 50% and the air is 27° C. and 60% during air conditioning of a clean room, for a predetermined air flow, for example, the moisture content in the air is reduced due to having cooled the air to 12° C. and 95%, and an electric heater reheats the air to bring to 23° C. and 50% (the moisture content is lower in the case of 95% relative humidity at 12° C. than the moisture content in the case of 60% relative humidity at 27° C.). In this situation, the energy consumption by the electric heater accounts for as much as 20%-40% of the energy consumption of the entire air conditioning system. An electric heater having poor energy efficiency compared to a heat pump has high output, and increases the overall energy consumption of the air conditioning system.

With regard to this situation, the inventors of the present application discovered from the sensible heat factor (SHF), which is the ratio of the sensible heat load to the sensible heat load and the latent heat load, that whether the sensible heat factor of the sensible heat load and the latent heat load processed by the air-cooling heat exchanger 22 deviates more or less is varied by the air flow. Given the same cooling capacity, a greater air flow increases the sensible heat factor, and a lesser air flow decreases the sensible heat factor. The inventors of the present application arrived at the present invention by preparing, in advance, data and model formulae of the quantity of sensible heat processing (quantity of cooling processing) and the quantity of latent heat processing (quantity of dehumidification processing) of a cooling heat exchanger using an air flow (supplied air flow) and a quantity of cooling, finding the quantity of cooling, the quantity of heating, and the quantity of humidification required to process the load at each fan step of the fan 28, and computing the combination of the quantity of cooling, the quantity of heating, and the quantity of humidification at which the supplied air flow is lowest within the range of capacities of the air-cooling heat exchanger 22, the electric heater 24, and the sprinkle-humidifier 26.

Thus, the blown air flow volume adjusting unit 88 and the controller 80 determine the supplied air output indicated value from the lowest supplied air flow capable of processing the sensible heat load and latent heat load requirement, and determine the cooling output indicated value, the heating output indicated value, and the humidification output indicated value on the premise of this supplied air flow.

To shorten the calculation time, instead of calculating for all of the fan steps, the combination of the volume of refrigerant, the quantity of heating, and the quantity of humidification capable of reducing the supplied air flow may be calculated several times for only the step above and below the current fan step to determine the combination capable of reducing the supplied air flow to the lowest and the indicated values.

Because there is only one combination of volume of refrigerant and quantity of heating at one fan step of the fan for the same sensible heat load and latent heat load, not only the supplied air output indicated value, but the cooling output indicated value and the heating output indicated value are always modified in the case that the supplied air output indicated value is modified.

(5) Features of Air Conditioning System 5-1

With this air conditioning system 10, the air-cooling heat exchanger handles the two actions of cooling and dehumidifying the air, and the controller 80 controls the quantity of cooling supplied by the heat exchanging medium to the air in the air-cooling heat exchanger 22 according to the higher output value of the cooling demand output value TcMV and the dehumidification demand output value McMV. On the other hand, because cooling and heating are conflicting actions, and dehumidifying and humidifying are conflicting actions, the electric heater 24 does not heat according to the heating demand output value ThMV unless the cooling demand output value TcMV is zero, and the sprinkler-humidifier 26 does not humidify according to the humidification demand output value HhMV unless the dehumidification demand output value HcMV is zero.

With such an air conditioning system 10, unless the cooling demand output value TcMV and/or the dehumidification demand output value HcMV is forcibly controlled to zero on the basis of the increment ΔTcMV of the cooling demand output value TcMV and/or the increment ΔHcMV of the dehumidification demand output value HcMV as described earlier, in the case that the load of the indoor space RM fluctuates and must transition from a first state demanding heating and dehumidifying (dehumidifying and warming operation) to a second state demanding cooling and humidifying (cooling and humidifying operation), the heating and/or humidifying action is actually delayed, causing unnecessary consumption of energy (see FIGS. 10(a) and 10(h)). The reason is that the air is humidified after the second state has been reached from the first state and the dehumidification demand output value HcMV has become zero, during which time, there is a case that the quantity of cooling adjusted on the basis of the cooling demand output value TcMV, which has become higher than the dehumidification demand output value HcMV, is supplied by the heat exchanging medium to the air in the air-cooling heat exchanger 22 to carry out a dehumidification action at or above the dehumidification demand quantity, at which point, the humidity of the indoor space RM has already dropped greatly below the target humidity by the time that humidification starts. In the case that load fluctuation has occurred requiring a transition from the second state to the first state, as shown in FIG. 11(a), the air is heated after the cooling demand output value TcMV has become zero, during which time, there is a case that the quantity of cooling adjusted on the basis of dehumidification demand output value HcMV, which has become higher than the cooling demand output value TcMV, is supplied by the heat exchanging medium to the air in the air-cooling heat exchanger 22 to carry out a cooling action at or above the cooling demand quantity, at which point, the temperature of the indoor space RM has already dropped greatly below the target temperature by the time that heating starts (see FIG. 11(b)).

To avoid such unnecessary consumption of energy, with the air conditioning system 10, the dehumidification demand output value HcMV is made zero in the case that the increment ΔTcMV of the cooling demand output value TcMV is greater than zero and the increment ΔHcMV of the dehumidification demand output value HcMV is zero or less, (see FIG. 4), and the cooling demand output value TcMV is made zero in the case that the increment ΔTcMV of the cooling demand output value TcMV is zero or less and the increment ΔHcMV of the dehumidification demand output value HcMV is greater than zero, (see FIG. 5). That is, with respect to the cooling demand output value TcMV and the dehumidification demand output value HcMV for determining control of the quantity of cooling for the air-cooling heat exchanger 22 for handling the two actions of cooling and dehumidifying the air with the air conditioning system 10, the controller 80 determines which of cooling or dehumidifying is becoming predominant, and controls the output value of the one which should not predominate to zero. Specifically, the controller monitors the increment ΔTcMV of the cooling demand output value TcMV and the increment ΔHcMV of the dehumidification demand output value HcMV, and forcibly overwrites the output value for which the increment is zero or lower in the case that one is greater than zero and the other is zero or lower. This improves tracking of fluctuation in sensible and latent heat loads, and reduces delay in starting up heating and/or humidifying, causing unnecessary consumption of energy (see FIGS. 10(c), 10(d), 11(c) and 11(d)).

5-2

With the air conditioning system 10, in the case that the increment ΔTcMV of the cooling demand output value TcMV is greater than zero and the increment ΔHcMV of the dehumidification demand output value HcMV is zero or less, the controller determines that cooling is becoming predominant over dehumidifying, and forcibly overwrites the dehumidification demand output value HcMV to zero, and controls so as to write the higher output value of the cooling demand output value TcMV and the dehumidification demand output value HcMV as the new cooling demand output value TcMV (see FIG. 4). Thus, of cooling and dehumidification, in the case that cooling is becoming predominant, and the increment of the dehumidification demand output value HcMV is zero or less, the cooling demand output value TcMV and the dehumidification demand output value HcMV are overwritten so as to prioritize the predominating cooling action. This reduces delay of the humidifying action, and suitably corrects the cooling demand output value TcMV to improve tracking of fluctuation in sensible and latent heat loads (see FIGS. 10(c) and 10(d)).

On the other hand, in the case that the increment ΔTcMV of the cooling demand output value TcMV is zero or less and the increment ΔHcMV of the dehumidification demand output value HcMV is greater than zero, the controller determines that dehumidifying is becoming predominant over cooling, and forcibly overwrites the cooling demand output value TcMV as zero and controls so as to write the higher output value of the cooling the demand output value TcMV and the dehumidification demand output value HcMV as the new dehumidification demand output value HcMV (see FIG. 5). Thus, of cooling and dehumidification, in the case that dehumidification is becoming predominant, and the increment ΔTcMV of the cooling demand output value TcMV is zero or lower, the cooling demand output value TcMV and the dehumidification demand output value HcMV are overwritten so as to prioritize the predominating dehumidification action. This reduces delay of the heating action, and suitably corrects the dehumidification demand output value to improve tracking of fluctuation in sensible and latent heat loads (see FIGS. 11(c) and 11(d))

5-3

With this air conditioning system 10, basically, the temperature MD controller 101 and/or the humidity PID controller 102 determine the output values (the heating demand output value ThMV, the cooling demand output value TcMV, the dehumidification demand output value HcMV, and the humidification demand output value HhMV) on the basis of the deviation of the current temperature and the current humidity from the temperature setting and the humidity setting, and controls devices (the circulating pump 42, the flow control valve 44, the electric heater 24, the sprinkler-humidifier 26) accordingly. To further increase the precision of estimation of the latent heat load and/or the sensible heat load and improve optimum control, the cooling load, the dehumidification load, the heating load, and the humidification load of the indoor space RM are periodically estimated with the air conditioning system 10, and if, for example, the difference between the estimated optimum control value Qsload and the cooling demand output value TcMV received by the cooling PID 101b is great during the cooling load estimation process, the cooling demand output value TcMV of the cooling MD 101b is corrected (overwritten). Because the output values (the heating demand output value ThMV, the cooling demand output value TcMV, the dehumidification demand output value HcMV, and the humidification demand output value HhMV) are corrected in this way during the load estimation processes, air conditioning is optimally controlled according to the load compared to control using only the temperature PID controller 101 and/or the humidity PID controller 102.

Because the load estimation processes are carried out periodically at a unit interval of several minutes, which is one minute or more, the estimation processes are refined to a degree that cannot be envisaged with the Pit) actions carried in the temperature controller 101 and/or the humidity PID controller 102 at a unit interval of several seconds, and have the advantage of obtaining high precision in estimating the latent heat load and/or the sensible heat load. Specifically, periodic load estimation processes alleviate the disadvantage of the estimation method that determining output values by the temperature PID controller 101 and/or the humidity PID controller 102 based on deviation only considers variations in slight time, resulting in improved precision in estimating loads and optimum control of air conditioning.

With the air conditioning system 10, a correction coefficient of the square root of (Gac/Ga) according to the air flow of the fan 28 is used to calculate the optimum cooling load control value Qsload and/or the optimum dehumidification load control value Qlload. Although the capacity of a device such as the air-cooling heat exchanger 22 for exchanging heat between the heat exchanging medium and the air varies according to the flow of the air passing through, using a correction coefficient according to the air flow can find a more optimum control value, ensuring optimum control of air conditioning.

5-4

With the air conditioning system 10, air-cooling heat exchanger 22 handles cooling and dehumidification of the air blown into the indoor space RM, and the electric heater 24 handles heating. Supplying coldness from the cold water comprising the heat exchanging medium in the air-cooling heat exchanger 22 to the air lowers the temperature of the air, and lowers the humidity of the air by moisture contained in the air condensing. Therefore, a phenomenon occurs in which the sensible heat load of the indoor space RM is processed at or above the requirement associated with dehumidifying air for processing the latent heat load of the indoor space RM as much as the requirement, resulting in the temperature of the air dropping too much. In this case, however, the electric heater 24 reheats the air to process the sensible heat load and the latent heat load of the indoor space RM as much as the requirement (see FIG. 8). When processing the latent heat load of the indoor space RM as much as the requirement is considered, a lesser quantity of cooling supplied by the heat exchanging medium to the air per unit time in the air-cooling heat exchanger 22 is acceptable in the case that the supplied air flow supplied by the fan 28 is plentiful, but a great quantity of cooling supplied to the air per unit time is required in the case that the supplied air flow is low. Therefore, previously, control for ensuring a certain level of supplied air flow has often been adopted to produce a margin for control.

The inventors of the present application, however, noticed that when the supplied air flow is plentiful, the ratio of the processing quantity of the sensible heat load to the total sensible heat load and latent heat load processed by the air-cooling heat exchanger 22 (the Sensible Heat Factor) is greater than when the supplied air flow is low, which increases the processing quantity of the sensible heat load which is processed simultaneously to process the latent heat load. Therefore, the inventors of the present application noted the supplied air flow, and conceived of adjusting the quantity of cooling, the quantity of heating, and the supplied air flow by selecting a second combination in the case that combinations of the quantity of cooling, the quantity of heating, and the supplied air flow capable of processing the sensible heat load and latent heat load requirement include a first combination and the second combination wherein the supplied air flow is less than this first combination. Thus, even in the case that the air-cooling heat exchanger 22 in the end processes the sensible heat load of the air at or above the requirement, this excess processing quantity can be reduced. This can reduce the quantity of heating during reheating by the electric heater 24 to achieve energy savings in the air conditioning system 10.

Figure 13:
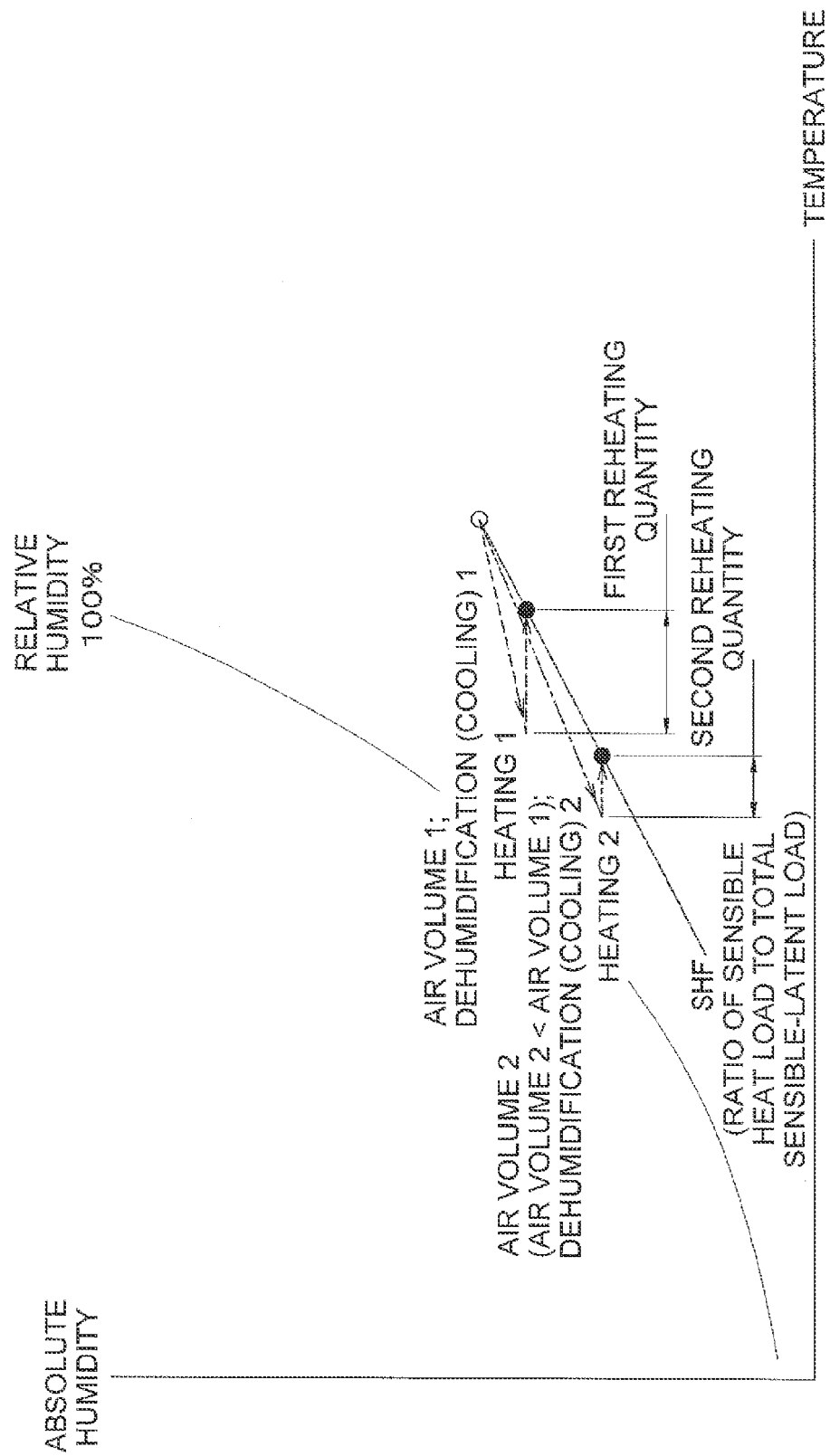
FIG. 13 is a psychrometric chart showing the relationship between size of air volume and quantity of reheating.

For example, reaming to FIG. 13, in the case of a first combination of an air flow 1, a quantity of dehumidification (quantity of cooling) 1, and a quantity of heating 1, the quantity of reheating by the electric heater 24 is a first quantity of reheating. In the case of a second combination of an air flow 2 less than the air flow 1, a quantity of dehumidification (quantity of cooling) 2, and a quantity of heating 2, however, the quantity of reheating of the electric heater 24 is a second quantity of reheating. Although the volume of cold water circulating in the air-cooling heat exchanger 22 must be increased to a degree corresponding to the lesser air flow in the case of the second combination having air flow 2 of lesser air flow, the quantity of reheating by the electric heater 24 is the second quantity of reheating, which is less than the first quantity of reheating in the case of the first combination. Although the electric power consumption of the chiller unit 50 is slightly increased with the second combination due to the increase in the volume of cold water, the electric power consumption of the electric heater 24 is reduced, which reduces overall electric power consumption. This is because the chiller unit 50 executing a vapor compression refrigerating cycle has greater efficiency than the electric heater 24. That is, although the electric heater 24 having relatively poor energy efficiency is employed, the quantity of heating during reheating by the electric heater 24 can be reduced by the air conditioning system 10 constricting the supplied air flow of the fan 28 as much as possible, to achieve energy savings for the overall air conditioning system 10.

(6) Modification Examples (6-1) Modification Example 1A

With the air conditioning system 10 according to the present embodiment, it was described that the discharge flow and the degree of opening of flow control valve 44 of the circulating pump 42 are adjusted according to the cooling output indicated value of the cooling adjusting unit 82 on the premise of controlling the temperature of the cold water flowing out from the evaporator 58 in the heat exchanging medium circuit 40 to a constant temperature, and the flow rate of the heat exchanging medium (cold water) circulating in the air-cooling heat exchanger 22 is adjusted to adjust the quantity of cooling supplied by the heat exchanging medium to the air in the air-cooling heat exchanger 22.

The parameter of the temperature of the cold water flowing out from the evaporator 58 in the heat exchanging medium circuit 40 may also be used, however, to adjust the quantity of cooling supplied by the heat exchanging medium to the air in the air-cooling heat exchanger 22 by the temperature of the cold water and the flow rate of the cold water. In this case, the output and/or the degree of opening of the compressor 52, the expansion valve 56, and the water pump 62 of the chiller unit 50 are regulated when adjusting the temperature of the cold water, and the quantity of reheating by the electric heater 24 can be reduced by increasing the capacity of the chiller unit 50 to lower the temperature of the cold water, and further constricting the air flow.

(6-2) Modification Example 1B

Although the air conditioning system 10 according to the present embodiment used a PID control logic in the temperature PID controller 101 and/or the humidity PID controller 102, another conventional control logic, such as PI control and/or a derivative PID control such as I-PD, may be used besides this PID control logic.

(6-3) Modification Example 1C

With the air conditioning system 10 according to the present embodiment, a mode was assumed in which the indoor air RA taken in from the indoor space RM circulates in air passages inside the casing 21 of the air conditioning unit 20, and is supplied to the indoor space RM as supply air SA after air conditioning. As shown by the broken lines in FIG. 1, however, a configuration may be applied in which outdoor air OA taken in from outdoors is taken into the casing 21 through an external air intake duct 33, then supplied to the indoor space RM after air conditioning this air. The present invention may also be applied to an air conditioning system in which both indoor air RA and outdoor air OA are taken into the air conditioning unit 20 and supplied to the indoor space RM.

(6-4) Modification Example 1D

With the air conditioning system 10 according to the present embodiment, in view of the fact that the heating capacity of the electric heater 24 and/or the humidification capacity of the sprinkler-humidifier 26 is hardly affected by the air flow of the fan 28, a correction coefficient according to the air flow of the fan 28 was not used when calculating the optimum control value during the periodic load estimation process. In the case that a hot water coil (air heating heat exchanger) is used as a heater or a steam heater coil is used as a humidifier, however, a correction coefficient according to the air flow of the fan 28 is preferably to be used in the same manner as calculation of the optimum cooling load control value Qsload and/or the optimum dehumidification load control value Qlload.

The invention claimed is:

1. An air conditioning system configured to process a sensible heat load and a latent heat load of a target space, and to adjust a temperature and humidity of the target space to target levels, the air conditioning system comprising:
   a cooling heat exchanger arranged and configured to circulate a heat exchanging medium usable to cool air blown into the target space, to cause heat exchange between the heat exchanging medium and the air, and to cool and dehumidify the air;
   a heater arranged and configured to heat the air cooled and dehumidified by the cooling heat exchanger;
   a fan arranged and configured to create an air flow into the target space through the cooling heat exchanger and the heater, the fan being configured to vary a speed of rotation in stages; and
   a control unit having
      a cooling adjusting unit configured to adjust a quantity of cooling supplied from the heat exchanging medium to the air in the cooling heat exchanger,
      a adjusting unit configured to adjust a quantity of heating supplied from the heater to the air, and
      an air flow adjusting unit configured to adjust an air flow volume supplied by the fan,
   the control unit being configured to
      find the quantity of cooling and the quantity of heating required to process the sensible heat load and latent heat load requirement at each stage of the speed of rotation of the fan, and
      adjust the quantity of cooling, the quantity of heating, and the air flow by selecting a combination in which the air flow is the lowest from among combinations of the quantity of cooling, the quantity of heating, and the air flow capable of processing the sensible heat load and latent heat load requirement.

2. The air conditioning system according to claim 1, wherein
   the control unit is further configured to find the quantity of cooling and the quantity of heating required to process the sensible heat load and latent heat load requirement for a stage above, when a higher stage is available, and a stage below, when a lower stage is available, a current stage of the speed of rotation of the fan.

3. The air conditioning system according to claim 2, further comprising
   a cooling device arranged and configured to cool the heat exchanging medium exchanging heat with the air; and
   a heat exchanging medium circuit having a pump, the heat exchanging medium circuit being arranged and configured to circulate the heat exchanging medium between the cooling device and the cooling heat exchanger,
   the cooling adjusting unit adjusts the quantity of cooling by varying at least one of
      the quantity of cooling of the heat exchanging medium performed by the cooling device, and
      a flow rate of the heat exchanging medium circulating in the cooling heat exchanger,
   the heat exchanging medium circuit further includes a flow control valve arranged and configured to adjust the flow rate of the heat exchanging medium,
   the pump has an adjustable capacity,
   the heater is an electric heater having a variable output in stages,
   the cooling adjusting unit adjusts the flow rate of the heat exchanging medium circulating in the cooling heat exchanger by at least one of varying the capacity of the pump and varying a degree of opening of the flow control valve,
   the heating adjusting unit adjusts the quantity of heating of the air by varying the output of the heater, and
   the air flow adjusting unit adjusts the air flow by varying the speed of rotation of the fan.

4. The air conditioning system according to claim 1, further comprising
   a cooling device arranged and configured to cool the heat exchanging medium exchanging heat with the air; and
   a heat exchanging medium circuit having a pump, the heat exchanging medium circuit being arranged and configured to circulate the heat exchanging medium between the cooling device and the cooling heat exchanger,
   the cooling adjusting unit adjusts the quantity of cooling by varying at least one of
      the quantity of cooling of the heat exchanging medium performed by the cooling device, and
      a flow rate of the heat exchanging medium circulating in the cooling heat exchanger,
   the heating medium circuit further includes a flow control valve arranged and configured to adjust the flow rate of the heat exchanging medium,
   the pump has an adjustable capacity,
   the heater is an electric heater having a variable output in stages,
   the cooling adjusting unit adjusts the flow rate of the heat exchanging medium circulating in the cooling heat exchanger by at least one of varying the capacity of the pump and varying a degree of opening of the flow control valve,
   the heating adjusting unit adjusts the quantity of heating of the air by varying the output of the heater, and
   the air flow adjusting unit adjusts the air flow by varying the speed of rotation of the fan.

* * * * *